US012262655B2

(12) United States Patent
Shintani et al.

(10) Patent No.: US 12,262,655 B2
(45) Date of Patent: Apr. 1, 2025

(54) AGRICULTURAL MACHINE

(71) Applicant: KUBOTA CORPORATION, Osaka (JP)

(72) Inventors: Koichi Shintani, Sakai (JP); Takanori Morimoto, Sakai (JP); Tomohiro Kinoshita, Sakai (JP); Ken Sakuta, Sakai (JP); Fumiya Yoshimura, Sakai (JP); Tsuyoshi Harada, Sakai (JP); Sho Watanabe, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 243 days.

(21) Appl. No.: 17/952,368

(22) Filed: Sep. 26, 2022

(65) Prior Publication Data

US 2023/0018138 A1 Jan. 19, 2023

Related U.S. Application Data

(63) Continuation of application No. PCT/JP2021/012614, filed on Mar. 25, 2021.

(30) Foreign Application Priority Data

Mar. 31, 2020 (JP) .................. 2020-065145

(51) Int. Cl.
*A01B 69/00* (2006.01)
*A01B 69/04* (2006.01)
*G05D 1/00* (2006.01)

(52) U.S. Cl.
CPC ......... *A01B 69/008* (2013.01); *G05D 1/0214* (2013.01)

(58) Field of Classification Search
CPC .......................... A01B 69/008; G05D 1/0214
See application file for complete search history.

(56) References Cited

U.S. PATENT DOCUMENTS

| 8,874,301 B1 * | 10/2014 | Rao ..................... B60K 28/04 340/576 |
| 2005/0039428 A1 * | 2/2005 | McMurtry ........... A01B 69/008 56/1 |

(Continued)

FOREIGN PATENT DOCUMENTS

| JP | 2008-092818 A | 4/2008 |
| JP | 2018-174891 A | 11/2018 |

(Continued)

OTHER PUBLICATIONS

Official Communication issued in International Patent Application No. PCT/JP2021/012614, mailed on Jun. 15, 2021.

*Primary Examiner* — Joan T Goodbody
*Assistant Examiner* — Godfrey Aleksander Maciorowski
(74) *Attorney, Agent, or Firm* — Keating & Bennett, LLP

(57) ABSTRACT

An agricultural machine includes a vehicle body, an obstacle detector to detect obstacles, an autonomous travel controller to perform autonomous travel of the vehicle body, the autonomous travel controller being configured or programmed to, when performing the autonomous travel, stop the vehicle body based on detection information about an obstacle detected by the obstacle detector, and a mode switch to switch a mode during the autonomous travel in an agricultural field between an effective mode in which the stopping of the vehicle body based on the detection information is allowed and an ineffective mode in which the stopping of the vehicle body based on the detection information is not allowed.

15 Claims, 22 Drawing Sheets

(56) References Cited

U.S. PATENT DOCUMENTS

| | | | |
|---|---|---|---|
| 2008/0115761 A1* | 5/2008 | Deguchi | F02D 11/105 |
| | | | 123/336 |
| 2015/0019043 A1* | 1/2015 | Creasey | G05D 1/0038 |
| | | | 701/2 |
| 2019/0329764 A1 | 10/2019 | Matsuzaki | |
| 2019/0382005 A1 | 12/2019 | Nishi et al. | |

FOREIGN PATENT DOCUMENTS

| JP | 2019-147553 A | | 9/2019 |
|---|---|---|---|
| JP | 2019147553 | * | 9/2019 |
| JP | 2019-175318 A | | 10/2019 |
| JP | 2019-187352 A | | 10/2019 |
| JP | 2019-192024 A | | 10/2019 |
| JP | 2019175318 | * | 10/2019 |
| JP | 2020-000141 A | | 1/2020 |

* cited by examiner

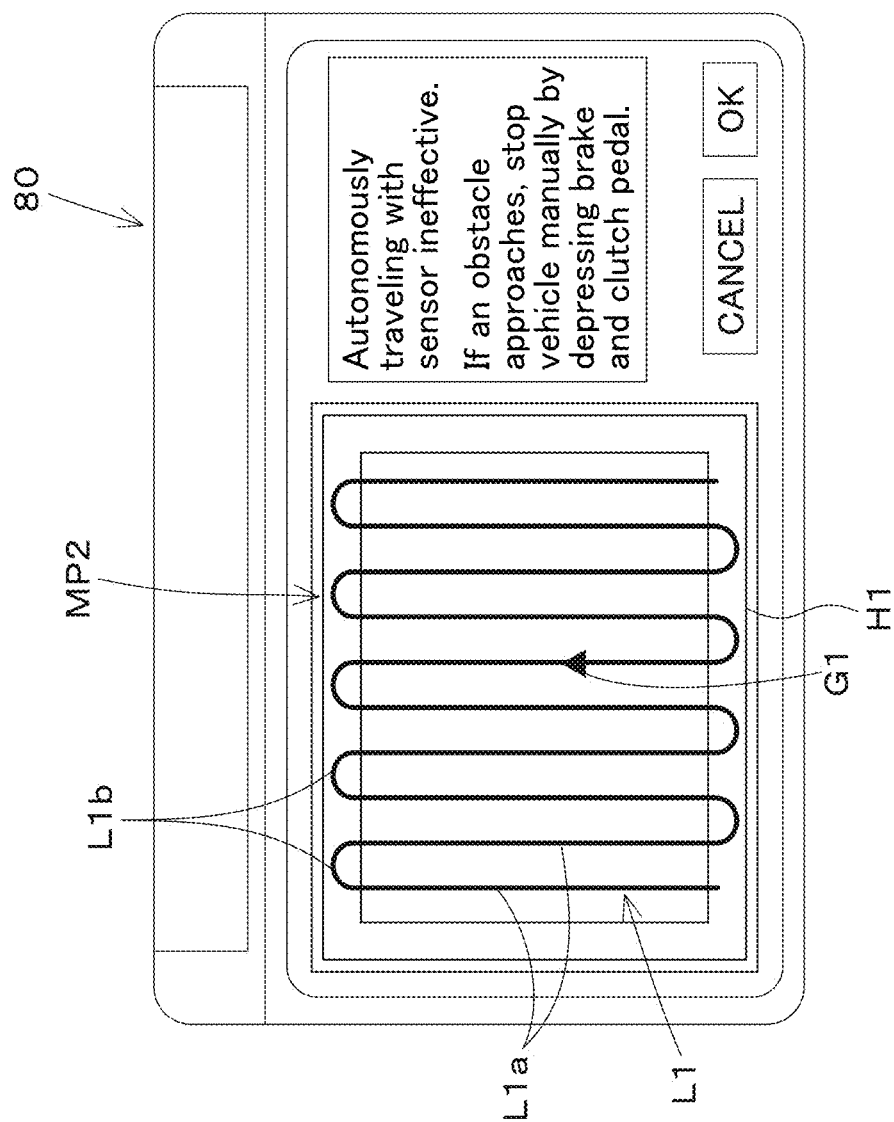

AGRICULTURAL MACHINE

CROSS REFERENCE TO RELATED APPLICATIONS

This application is a continuation application of International Application No. PCT/JP2021/012614, filed on Mar. 25, 2021, which claims the benefit of priority to Japanese Patent Application No. 2020-065145, filed on Mar. 31, 2020. The entire contents of each of these applications are hereby incorporated herein by reference.

BACKGROUND OF THE INVENTION

1. Field of the Invention

The present invention relates to agricultural machines such as a tractor, a combine, and a rice transplanter.

2. Description of the Related Art

To date, an agricultural machine disclosed in Japanese Unexamined Patent Application Publication No. 2008-92818 is known. The agricultural machine (agricultural working vehicle) disclosed in Japanese Unexamined Patent Application Publication No. 2008-92818 can perform autonomous travel, includes an obstacle detector (obstacle detection means) that can detect an obstacle in front of a vehicle body, and can stop autonomous travel when detecting an obstacle.

SUMMARY OF THE INVENTION

However, the agricultural machine disclosed in Japanese Unexamined Patent Application Publication No. 2008-92818, which can stop the vehicle body when the obstacle detector detects an obstacle, may unnecessarily stop the vehicle body by detecting a crop or the like as an obstacle depending on an agricultural field.

Preferred embodiments of the present invention provide agricultural machines that each can change a condition for stopping autonomous travel in accordance with the circumstances.

An agricultural machine includes a vehicle body, an obstacle detector to detect obstacles, an autonomous travel controller to perform autonomous travel of the vehicle body, the autonomous travel controller being configured or programmed to, when performing the autonomous travel, stop travel of the vehicle body based on detection information about an obstacle detected by the obstacle detector, and a mode switch to switch the autonomous travel controller between an effective mode in which the autonomous travel controller when performing the autonomous travel is allowed to stop travel of the vehicle body based on the detection information and an ineffective mode in which the autonomous travel controller when performing the autonomous travel is not allowed to stop travel of the vehicle body based on the detection information.

The agricultural machine may include a support to which the obstacle detector is attached, the support being capable of changing a position of the obstacle detector to a detection position where the obstacle detector is allowed to detect obstacles and to a retracted position where the obstacle detector is not allowed to detect obstacles, and the autonomous travel controller may be configured or programmed to be allowed to perform the autonomous travel when the autonomous travel controller is in the ineffective mode and the obstacle detector is in the retracted position.

The agricultural machine may include a seat-occupation detector to detect whether an operator's seat is occupied, and the autonomous travel controller may be configured or programmed to be allowed to perform the autonomous travel when the seat-occupation detector is detecting that the operator's seat is occupied.

The agricultural machine may include a support to which the obstacle detector is attached, the support being capable of changing a position of the obstacle detector to a detection position where the obstacle detector is allowed to detect obstacles and to a retracted position where the obstacle detector is not allowed to detect obstacles, and a switch restraint to allow the mode switch to switch from the effective mode to the ineffective mode when the obstacle detector is in the retracted position, and not allow the mode switch to switch from the effective mode to the ineffective mode when the obstacle detector is in the detection position.

The agricultural machine may include a seat-occupation detector to detect whether an operator's seat is occupied, and a switch restraint to allow the mode switch to switch from the effective mode to the ineffective mode when the seat-occupation detector is detecting that the operator's seat is occupied, and not allow the mode switch to switch from the effective mode to the ineffective mode when the seat-occupation detector detects that the operator's seat is not occupied.

The agricultural machine may include a seat-occupation detector to detect whether an operator's seat is occupied, and the autonomous travel controller may be configured or programmed to, when performing the autonomous travel, continue performing the autonomous travel when the seat-occupation detector is detecting that the operator's seat is occupied, and stop the autonomous travel when the seat-occupation detector detects that the operator's seat is not occupied.

The agricultural machine may include a support to which the obstacle detector is attached, the support being capable of changing a position of the obstacle detector to a detection position where the obstacle detector is allowed to detect obstacles and to a retracted position where the obstacle detector is not allowed to detect obstacles, and the autonomous travel controller may be configured or programmed to, when performing the autonomous travel and in the ineffective mode, continue performing the autonomous travel when the obstacle detector is in the retracted position, and stop the autonomous travel when the position of the obstacle detector changes from the retracted position to the detection position.

The agricultural machine may include a prime mover and an ignition switch operable to perform switching between ON and OFF of driving of the prime mover, and the mode switch may set the effective mode as a default according to switching of the ignition switch from OFF to ON, and, when the ineffective mode is set, switch the ineffective mode to the effective mode according to switching of the ignition switch from ON to OFF.

The agricultural machine may include a display to display whether the autonomous travel controller is in the effective mode or in the ineffective mode.

The autonomous travel controller may be configured or programmed to stop the vehicle body if the autonomous travel controller, when in the effective mode, acquires detection of an obstacle by the obstacle detector as the detection information.

The obstacle detector may be operable to, even when detecting an obstacle, not output detection of the obstacle to the autonomous travel controller when in the ineffective mode.

The obstacle detector may be operable to notify the autonomous travel controller when in the effective mode that an obstacle is detected during the autonomous travel, and not notify the autonomous travel controller when in the ineffective mode that an obstacle is detected.

The agricultural machine may include a support to which the obstacle detector is attached, the support being capable of changing a position of the obstacle detector to a detection position where the obstacle detector is allowed to detect obstacles and to a retracted position where the obstacle detector is not allowed to detect obstacles, and the autonomous travel controller may be configured or programmed to be allowed to start the autonomous travel when the autonomous travel controller is in the effective mode and the obstacle detector is in the detection position, be allowed to stop the autonomous travel when the autonomous travel controller is in the effective mode and the obstacle detector is in the retracted position, be allowed to stop the autonomous travel when the autonomous travel controller is in the ineffective mode and the obstacle detector is in the detection position, and be allowed to start the autonomous travel when the autonomous travel controller is in the ineffective mode and the obstacle detector is in the retracted position.

The agricultural machine may include a seat-occupation detector to detect whether an operator's seat is occupied, and the autonomous travel controller may be configured or programmed to be allowed to perform the autonomous travel when the seat-occupation detector is detecting that the operator's seat is occupied.

The agricultural machine may include a switch restraint to allow the mode switch to switch from the effective mode to the ineffective mode when the obstacle detector is in the retracted position, and not allow the mode switch to switch from the effective mode to the ineffective mode when the obstacle detector is in the detection position.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 20 illustrates a screen of a display during autonomous travel according to the present preferred embodiment of the present invention.

DETAILED DESCRIPTION OF THE PREFERRED EMBODIMENTS

Figure 1:
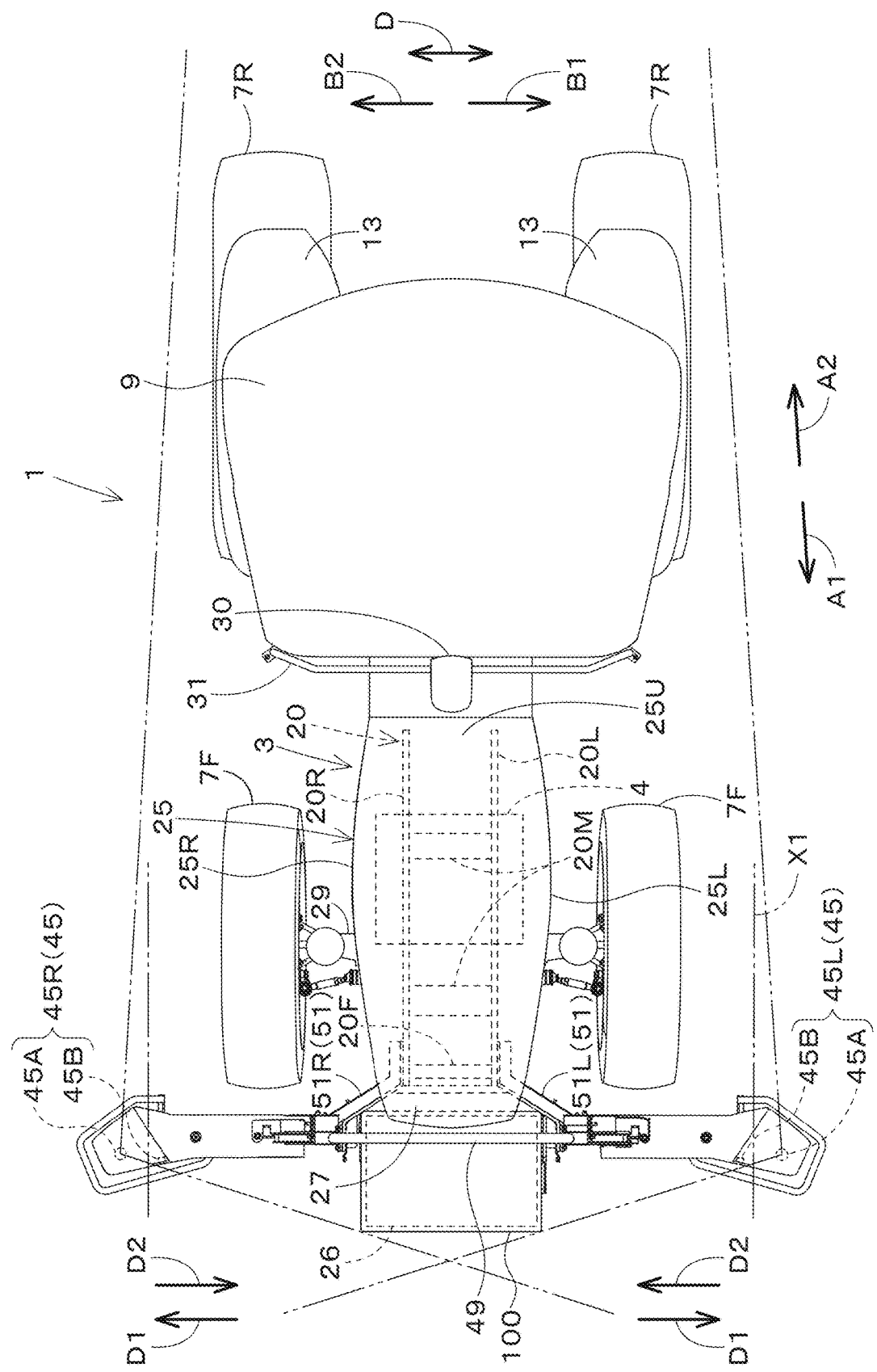
FIG. 1 is an overall plan view of a tractor according to a preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

Figure 2:
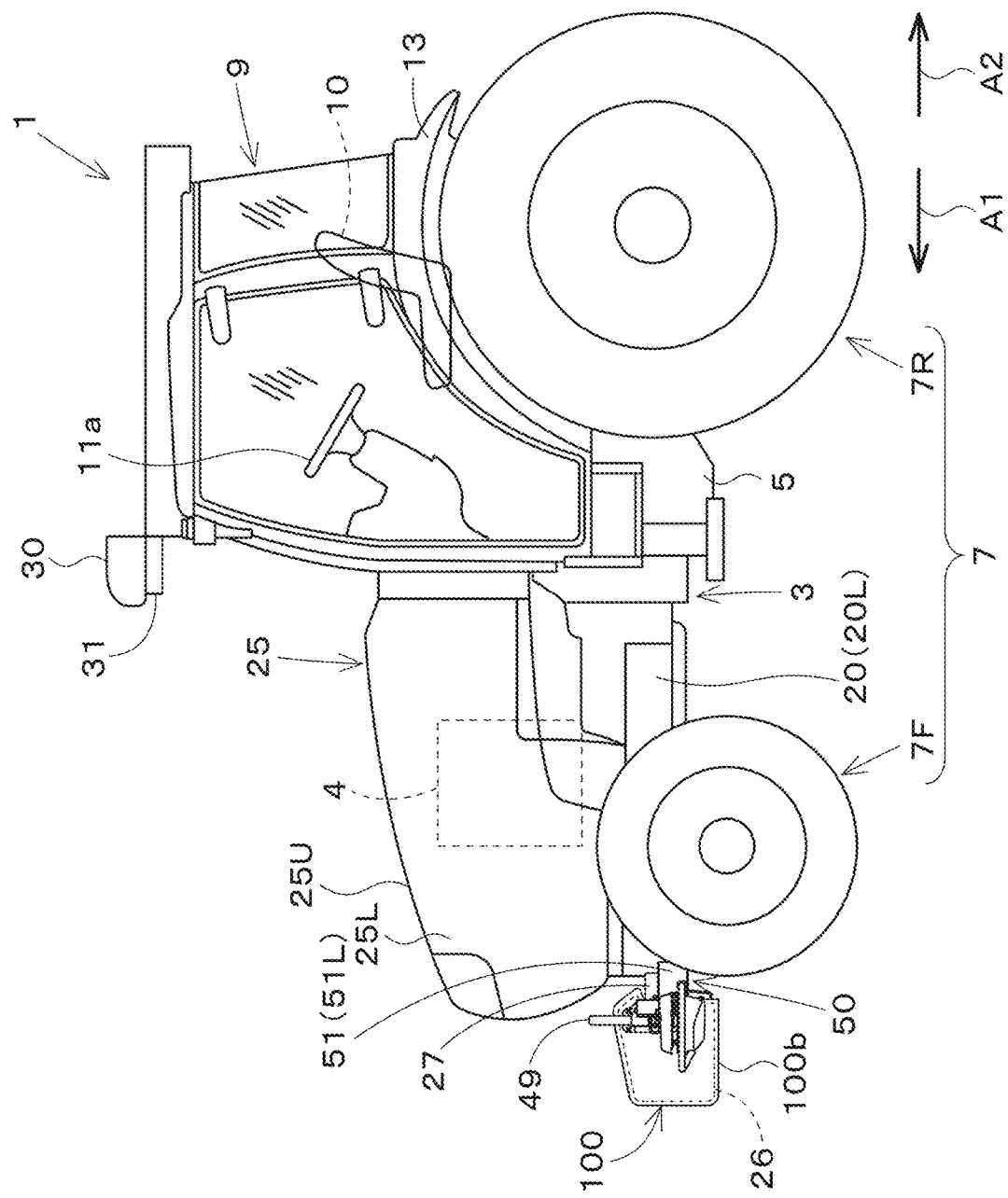
FIG. 2 is an overall side view of the tractor.

FIGS. 1 and 2 illustrate a preferred embodiment of an agricultural machine 1 according to the present invention. In describing the present preferred embodiment, it is assumed that the agricultural machine 1 is a tractor 1. However, the agricultural machine 1 may be, instead of a tractor, another agricultural machine (agricultural vehicle) such as a combine or a rice transplanter.

Hereafter, for convenience of description, the direction of arrow A1 in FIGS. 1 and 2 will be referred to as the forward direction, the direction of arrow A2 will be referred to as the backward direction, the direction of arrow B1 will be referred to as the leftward direction, the direction of arrow B2 will be referred to as the rightward direction, and the direction of arrow D will be referred to as the vehicle-body width direction (or the width direction). A vehicle-body width direction away from a center in the vehicle-body width direction (the direction of arrow D1) will be referred to as the vehicle-body-width outward direction (or the outward direction), and a vehicle-body width direction toward a center in the vehicle-body width direction (the direction of arrow D2) will be referred to as the vehicle-body-width inward direction (or the inward direction).

Hereafter, the tractor will be described. As illustrated in FIGS. 1 and 2, the tractor 1 includes a vehicle body 3, a prime mover 4, and a transmission 5. A travel device 7 is provided in the vehicle body 3. The travel device 7 supports the vehicle body 3 so that the vehicle body 3 is capable of traveling, and has front wheels 7F and rear wheels 7R. The front wheels 7F and the rear wheels 7R, which are tires in the present preferred embodiment, may be crawlers. The prime mover 4 is an engine (diesel engine, gasoline engine), an electric motor, or the like. The transmission 5 can switch the propelling force of the travel device 7 by speed change, and can switch between forward movement and backward movement of the travel device 7. An operator's seat 10 is provided in the vehicle body 3. The operator's seat 10 is protected by a protector 9. In the present preferred embodiment, the protector 9 is a cabin that protects the operator's seat 10 by surrounding the front, the back, the top, and the sides of the operator's seat 10. However, the protector 9 may be a ROPS or the like that protects the operator's seat 10 by covering at least the top of the operator's seat 10. Fenders 13 are attached to a lower portion the protector 9, and the fenders 13 cover upper portions of the rear wheels 7R.

A coupler (not shown), which includes a three-point linkage and the like, is provided in a rear portion of the vehicle body 3. A working device (implement or the like) can be removably coupled to the coupler. By coupling the working device to the coupler, the working device can be pulled by the vehicle body 3. The working device is a cultivator that performs cultivation, a fertilizer spreader that spreads fertilizer, an agricultural chemical spreader that spreads agricultural chemicals, a harvester that performs harvesting, a mower that performs mowing of grass and the like, a tedder that spreads grass and the like, a rake that gathers grass and the like, a baler that forms grass and the like into a bale, or the like.

The vehicle body 3 has a vehicle body frame 20. As illustrated in FIG. 1, the vehicle body frame 20 includes a vehicle body frame 20L provided on the left side and a vehicle body frame 20R provided on the right side. The vehicle body frame 20L and the vehicle body frame 20R each extend forward from the transmission 5 and support a lower portion of the prime mover 4. The vehicle body frame 20L and the vehicle body frame 20R are separated from each other in the vehicle-body width direction. A front end portion of the vehicle body frame 20L and a front end portion of the vehicle body frame 20R are coupled to each other via a front coupling plate 20F. A middle portion of the vehicle body frame 20L and a middle portion of the vehicle body frame 20R are coupled to each other via a middle coupling plate 20M. The vehicle body frame 20L and the vehicle body frame 20R support a front axle case 29. A front axle 15 (see FIG. 6), which rotatably supports the front wheels 7F, is accommodated in the front axle case 29. That is, in the present preferred embodiment, the vehicle body frame 20 is a front axle frame that supports the front axle 15. The vehicle body frame 20 may be a frame that supports a structure other than the front axle case 29 (a frame other than the front axle frame).

Figure 3:
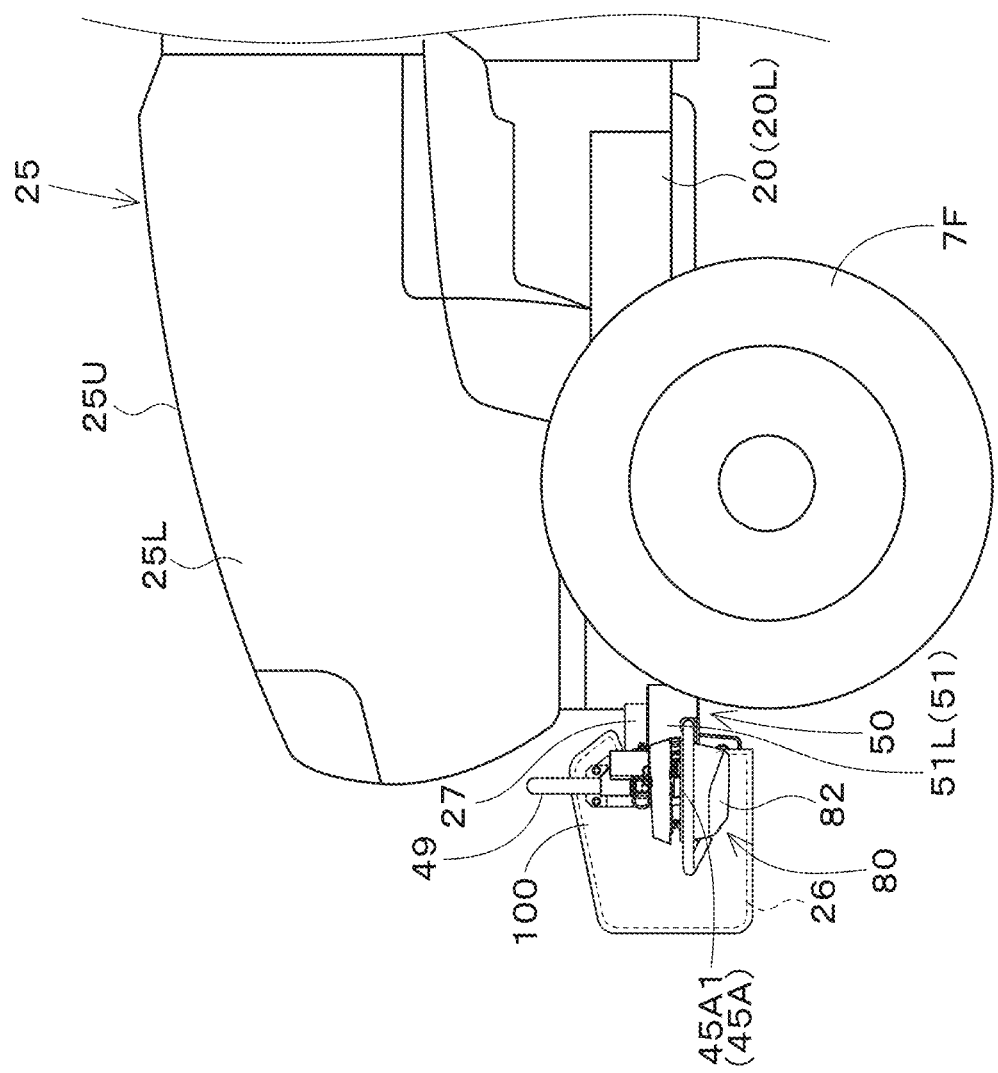
FIG. 3 is an enlarged side view of a front portion of the tractor.

As illustrated in FIGS. 1 to 3, a hood 25 is provided upward of the vehicle body frame 20. The hood 25 extends in the front-back direction along the vehicle body frame 20. The hood 25 is disposed forward of a middle portion of the protector 9 in the width direction. The hood 25 has a left side wall 25L provided on the left side, a right side wall 25R provided on the right side, and an upper wall portion 25U that couples upper portions of the left side wall 25L and the right side wall 25R. An engine room is defined by the left side wall 25L, the right side wall 25R, and the upper wall portion 25U; and the prime mover 4, a cooling fan, a radiator, a battery, and the like are accommodated in the engine room. The front wheels 7F are respectively disposed leftward of the left side wall 25L and rightward of the right side wall 25R.

A weight 26 is provided forward of the hood 25, that is, forward of the vehicle body frames 20L and 20R. The weight 26 is attached to a weight bracket (weight attachment portion) 27 provided in a front portion of the vehicle body 3. The weight bracket 27 is attached to the front coupling plate 20F of the vehicle body frame 20L by using a fastener such as a bolt. The periphery of the weight 26 is covered by a weight cover 100.

Figure 6:
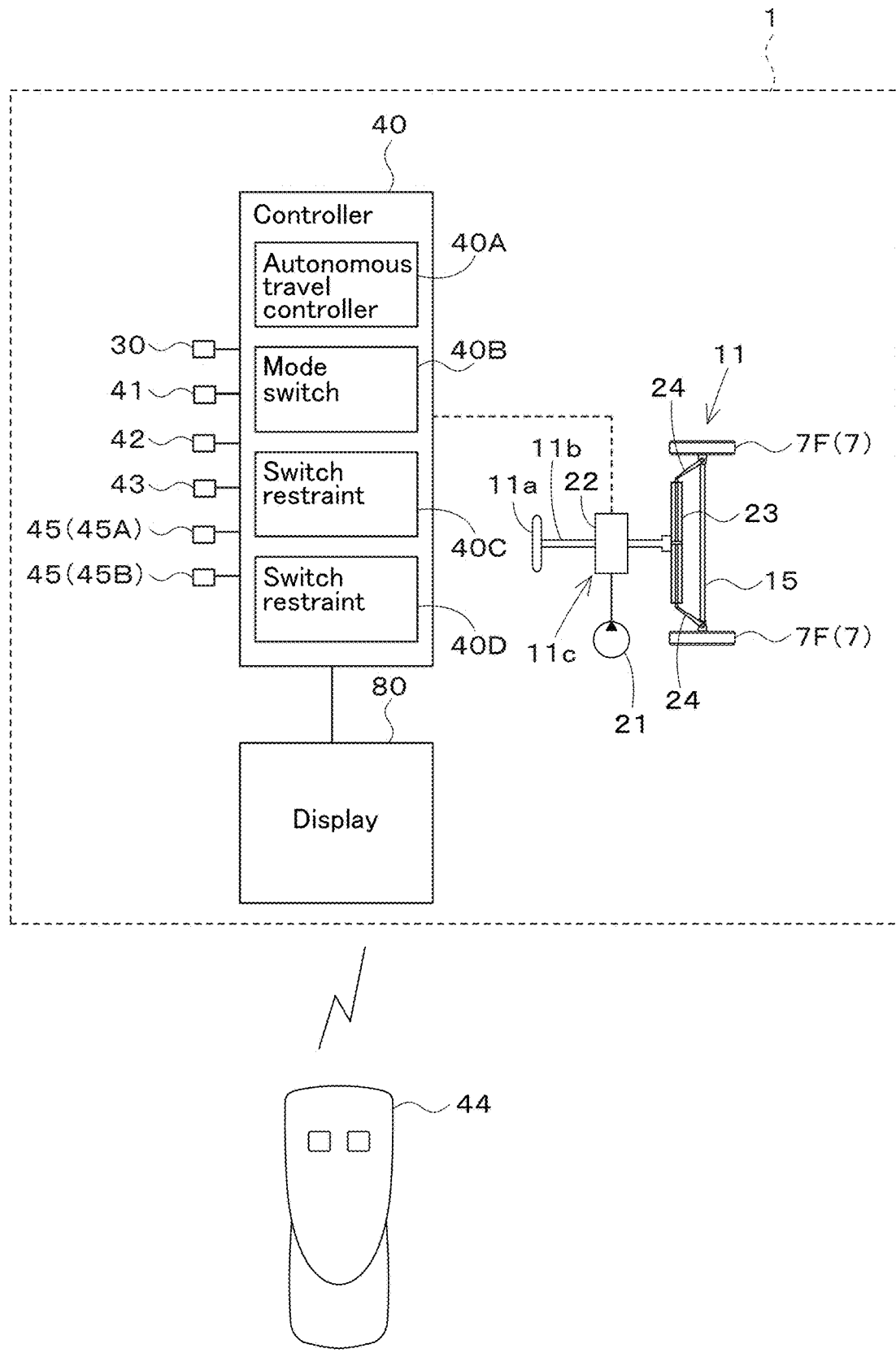
FIG. 6 is a block diagram of a control system of the tractor.

As illustrated in FIG. 6, the tractor 1 includes a steering device 11. The steering device 11 has a steering wheel 11a, a rotary shaft (steering shaft) 11b that rotates as the steering wheel 11a rotates, and an assist mechanism (power steering mechanism) 11c that assists in steering of the steering wheel 11a. The assist mechanism 11c includes a hydraulic pump 21, a control valve 22 to which a hydraulic fluid delivered from the hydraulic pump 21 is supplied, and a steering cylinder 23 that is activated by the control valve 22. The control valve 22 is a solenoid valve that is activated based on a control signal. The control valve 22 is, for example, a three-position switching valve that is switchable by movement of a spool or the like. The control valve 22 is switchable also by steering of the steering shaft 11b. The steering cylinder 23 is connected to arms (knuckle arms) 24 that change the orientation of the front wheels 7F.

Accordingly, when the steering wheel 11a is operated, the switching position and the opening of the control valve 22 are switched in accordance with the steering wheel 11a, the steering cylinder 23 extends leftward or rightward in accordance with the switching position and the opening of the control valve 22, and thus the steering direction of the front wheels 7F can be changed. The steering device 11 described above is an example, and the configuration of the steering device 11 is not limited to the configuration described above.

Hereafter, a position detector and a controller will be described. As illustrated in FIGS. 1 and 2, the tractor 1 includes a position detector 30. The position detector 30 is attached to a front portion of the top panel of the protector 9 via a mounter 31. However, the attachment position of the position detector 30 is not limited to the position illustrated in the figures, and the position detector 30 may be attached onto the top panel of the protector 9 or may be attached to another portion of the vehicle body 3. The position detector 30 may be attached to the aforementioned working device, such as a cultivator.

The position detector 30 is a device that detects the position thereof (measured position including latitude and longitude) by using a satellite positioning system. That is, the position detector 30 receives signals (positions of positioning satellites, transmission time, correction information, and the like) transmitted from the positioning satellites, and detects the position (latitude, longitude) based on the received signals. The position detector 30 may detect, as the position (latitude, longitude) thereof, a corrected position that is corrected based on a correction signal and the like from a base station (reference station) that can receive signals from the positioning satellites. Alternatively, the position detector 30 may have an inertial measurement unit such as a gyroscope sensor or an acceleration sensor, and may detect, as the position thereof, a position corrected by the inertial measurement unit. With the position detector 30, it is possible to detect the position (travel position) of the vehicle body 3 of the tractor 1.

Hereafter, a controller and a display will be described. As illustrated in FIG. 6, the tractor 1 includes a controller 40 and a display 80. The controller 40 includes a CPU, an electric circuit, an electronic circuit, and the like, and controls the tractor 1 in various ways. The display 80 has a liquid crystal panel, an organic EL panel, or the like, and displays information about various types.

A state detector 41, which detects a driving state and the like of the tractor 1, and an ignition switch 42 are connected to the controller 40.

The state detector 41 is, for example, a device that detects a state of a travel system or the like, and detects, for example, states of a crank sensor, a cam sensor, an engine rotation sensor, an accelerator sensor, a vehicle speed sensor, a steering angle sensor, the position detector 30, and the like. The state detector 41 may be a device that detects a state of a portion other than the travel system, such as elevation lever detection sensor, a PTO rotation detection sensor, or the like.

The ignition switch 42 is a switch that is set around the operator's seat 10 and that an operator can operate. The ignition switch 42 is a switch that is switchable between ON and OFF. When the ignition switch 42 is ON, the prime mover 4 is driven, and, when the ignition switch 42 is OFF, the prime mover 4 is stopped being driven. The ignition switch 42 may include an accessory switch to supply electric power to electric components. In this case, the ignition switch 42 is switchable between a first ON-position to drive the prime mover 4, a second ON-position to supply electric power to electric components, and an OFF-position.

A seat-occupation detector 43 is connected to the controller 40. The seat-occupation detector 43 is a device to detect whether or not the operator's seat 10 is occupied. The seat-occupation detector 43 is a pressure sensor or a vibration sensor that is set in a seat portion or a backrest of the operator's seat 10, a camera that is set around the operator's seat 10, or the like. When the seat-occupation detector 43 is a pressure sensor or a vibration sensor, the seat-occupation detector 43 detects that the operator's seat 10 is occupied if a pressure (vibration) of a predetermined magnitude or more is detected, and the seat-occupation detector 43 detects that the operator's seat 10 is not occupied if a pressure (vibration) of less than a predetermined magnitude is detected. When the seat-occupation detector 43 is a camera, the seat-occupation detector 43 detects that the operator's seat is occupied if the camera detects a person on the operator's seat 10, and the seat-occupation detector 43 detects that the operator's seat 10 is not occupied if the camera does not detect a person on the operator's seat 10. The seat-occupation detector 43 is an example and is not limited.

The controller 40 performs control of the travel system of the tractor 1 and control of the working system of the tractor 1. The controller 40 controls, for example, the engine rotation speed, the vehicle speed, the steering angle of the steering device 11, and the like based on a detection state detected by the state detector 41. The controller 40 performs control of autonomous travel based on a detection state detected by the state detector 41. To be specific, the controller 40 includes an autonomous travel controller 40A. The autonomous travel controller 40A includes an electric/electronic circuit provided in the controller 40, a program stored in the controller 40, and the like.

Figure 17:
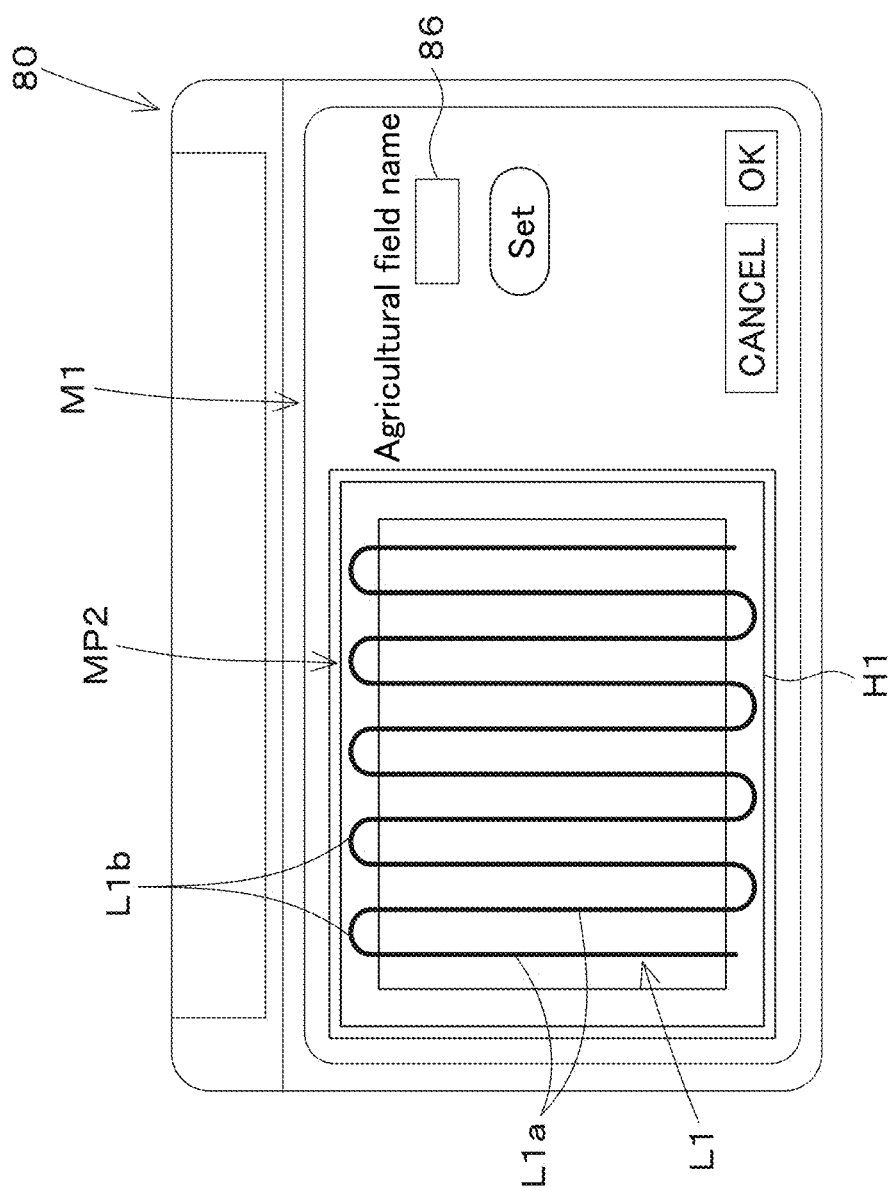
FIG. 17 illustrates an example of a creation screen according to the present preferred embodiment of the present invention.

In performing autonomous travel, as illustrated in FIG. 17, a travel route (planned travel route) L1 is created by using the display 80 and the like. First, creation of the planned travel route L1 will be described.

As illustrated in FIG. 17, when an operator or the like performs a predetermined operation on the display 80, the display 80 displays a creation screen M1 to create the planned travel route L1. For example, when an operator or the like inputs a predetermined agricultural field name to an agricultural-field input portion 86 of the creation screen M1, the display 80 displays on the creation screen M1 an agricultural field map (agricultural field map MP2) input to the agricultural-field input portion 86. By performing a predetermined operation on the display 80, it is possible to create a travel route (planned travel route) L1 of the vehicle body 3 on the agricultural field map MP2. In creating the planned travel route L1, for example, in the agricultural field map MP2, it is possible to create straight movement portions L1a representing straight movements and turning portions L1b representing turns, as the planned travel route L1. The distances between the straight movement portions L1a in the width direction, the number of the straight movement portions L1a, and the like may be set in any appropriate manner. That is, with the display 80, it is possible to set (create) the planned travel route L1 to perform autonomous travel in the agricultural field H1. A planned travel route L1 created by using an external apparatus such as a server may be acquired by the tractor 1 and displayed on the display 80.

When creation of the planned travel route L1 is complete and a command to start autonomous travel is issued, the autonomous travel controller 40A performs control of autonomous travel (autonomous travel control). As illustrated in FIG. 6, a command to start autonomous travel may be issued by using a remote control 81 to perform remote control, or by using a switch 82 that is set around the operator's seat or the like of the tractor 1.

In autonomous travel control, the autonomous travel controller 40A sets the switching position and the opening of the control valve 22 so that at least the travel position (position detected by the position detector 30) of the vehicle body 3 coincides with a predetermined travel route (travel path), that is, so that the vehicle body 3 coincides with the planned travel route L1. In other words, the controller 40 sets the movement direction and the movement distance of the steering cylinder 23 (the steering direction and the steering angle of the front wheels 7F) so that the travel position of the tractor 1 coincides with the planned travel route L1.

To be specific, the autonomous travel controller 40A compares the travel position of the vehicle body 3 with a position indicated by the planned travel route L1 (planned travel position). When the travel position coincides with the planned travel position, the autonomous travel controller 40A does not change and holds the steering angle and steering direction of the steering wheel 11a of the steering device 11 (the steering angle and the steering direction of the front wheels 7F) (does not change and maintains the opening and the switching position of the control valve 22). When the travel position does not coincide with the planned travel position, the autonomous travel controller 40A changes the steering angle and/or the steering direction of the steering wheel 11a of the steering device 11 (changes the opening and/or the switching position of the control valve 22) so that the difference (displacement) between the travel position and the planned travel position becomes zero.

In the preferred embodiment described above, in autonomous travel control, the autonomous travel controller 40A changes the steering angle of the steering device 11 based on the difference between the travel position and the planned travel position. If the orientation of the planned travel route L1 differs from the orientation (vehicle-body orientation) of the movement direction (travel direction) of the tractor 1 (the vehicle body 3), the autonomous travel controller 40A may set the steering angle so that the vehicle-body orientation coincides with the orientation of the planned travel route L1. In autonomous travel control, the autonomous travel controller 40A may set the final steering angle in autonomous travel control based on a steering angle obtained based on the difference (positional deviation) and a steering angle obtained based on an orientational deviation. The steering angle may be set by using a method different from the above-described method of setting the steering angle in autonomous travel control.

In autonomous travel control, the autonomous travel controller 40A may control the rotation speed of the travel device 7, that is, the front wheels 7F and/or the rear wheels 7R so that the actual vehicle speed of the tractor 1 (the vehicle body 3) coincides with a vehicle speed corresponding to a predetermined planned travel route L1.

The autonomous travel controller 40A controls autonomous travel based on the detection result of detecting an obstacle by an obstacle detector 45. For example, the autonomous travel controller 40A continues autonomous travel when the obstacle detector 45 is not detecting an obstacle, and stops autonomous travel when the obstacle detector 45 detects an obstacle. To be more specific, when the obstacle detector 45 detects an obstacle, the autonomous travel controller 40A stops autonomous travel by stopping travel of the tractor 1 if the distance between the obstacle and the tractor 1 is less than or equal to a predetermined threshold (stop threshold).

During autonomous travel, the autonomous travel controller 40A continues autonomous travel when the seat-occupation detector 43 is detecting that the operator's seat is occupied and stops autonomous travel when the seat-occupation detector 43 detects that the operator's seat is not occupied.

As illustrated in FIG. 20, during autonomous travel (when autonomous travel is being performed), a figure G1 representing the tractor 1 (the vehicle body 3) and the planned travel route L1 are displayed on the display 80.

Hereafter, details of the obstacle detector will be described. As illustrated in FIG. 1, the tractor 1 includes a plurality of obstacle detectors 45. Each of the plurality of obstacle detectors 45 can detect an object, that is, an obstacle that is present around the tractor 1. At least one of the plurality of obstacle detectors 45 is provided forward of the protector 9 and outward of the hood 25. That is, at least one obstacle detector 45 is disposed, in a region forward of the protector 9 of the tractor 1, in a region further leftward than the left side wall 25L of the hood 25 or a region further rightward than the right side wall 25R of the hood 25. In the present preferred embodiment, the plurality of obstacle detectors 45 include an obstacle detector 45L provided on the left side of the vehicle body 3 (on the left side of the hood 25) and an obstacle detector 45R provided on the right side of the vehicle body 3 (the right side of the hood 25).

The obstacle detectors 45 are provided forward of the front wheels 7F and farther outward than the front wheels 7F. The obstacle detector 45L is provided forward of the left front wheel 7F and farther outward (leftward) than the left front wheel 7F. The obstacle detector 45R is provided forward of the right front wheel 7F and farther outward (rightward) than the right front wheel 7F. In other words, the obstacle detector 45L is provided leftward and forward of the left front wheel 7F, and the obstacle detector 45R is provided rightward and forward of the right front wheel 7F.

Figure 9:
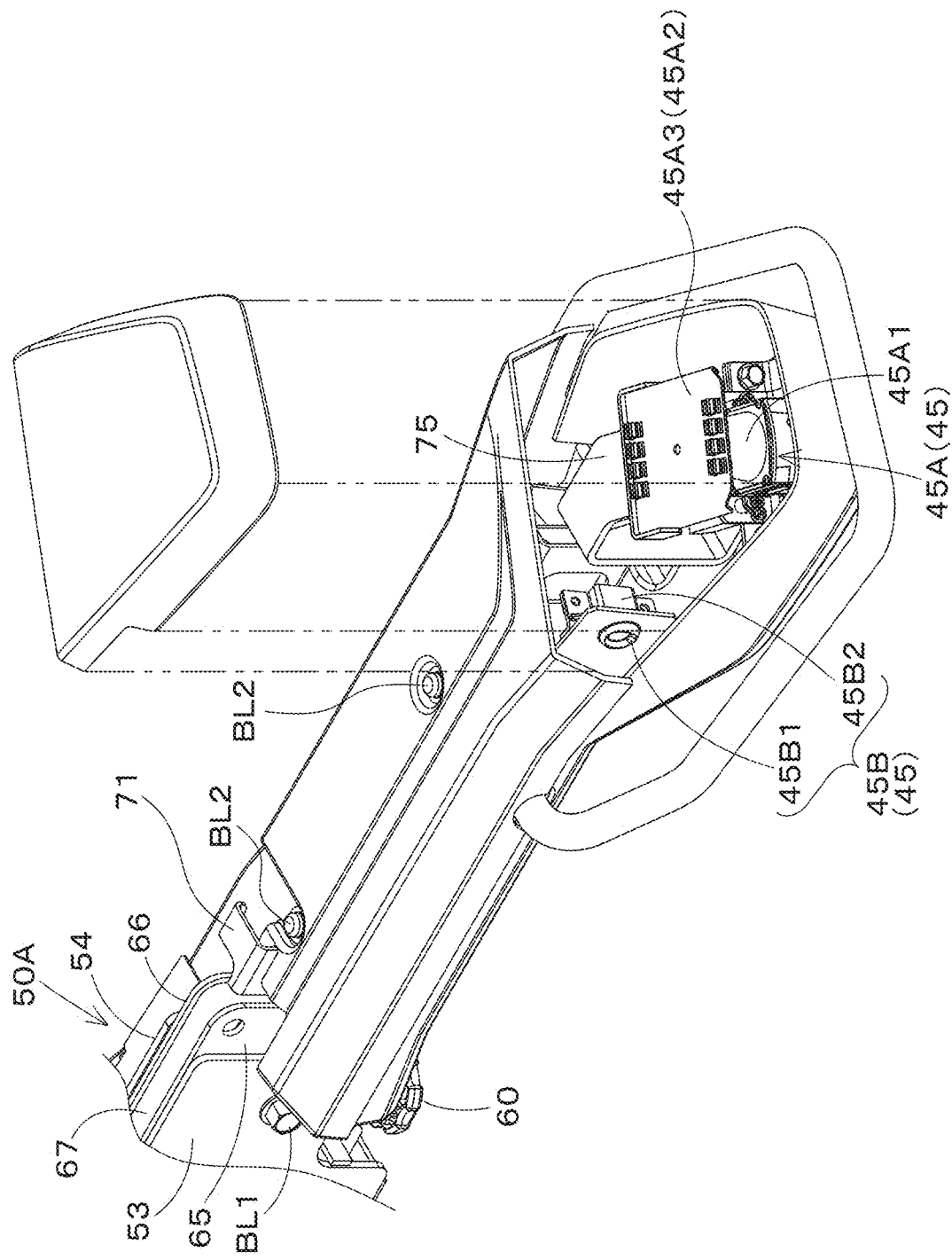
FIG. 9 is a perspective view illustrating a state in which a separable cover is removed from a cover body.
Figure 10:
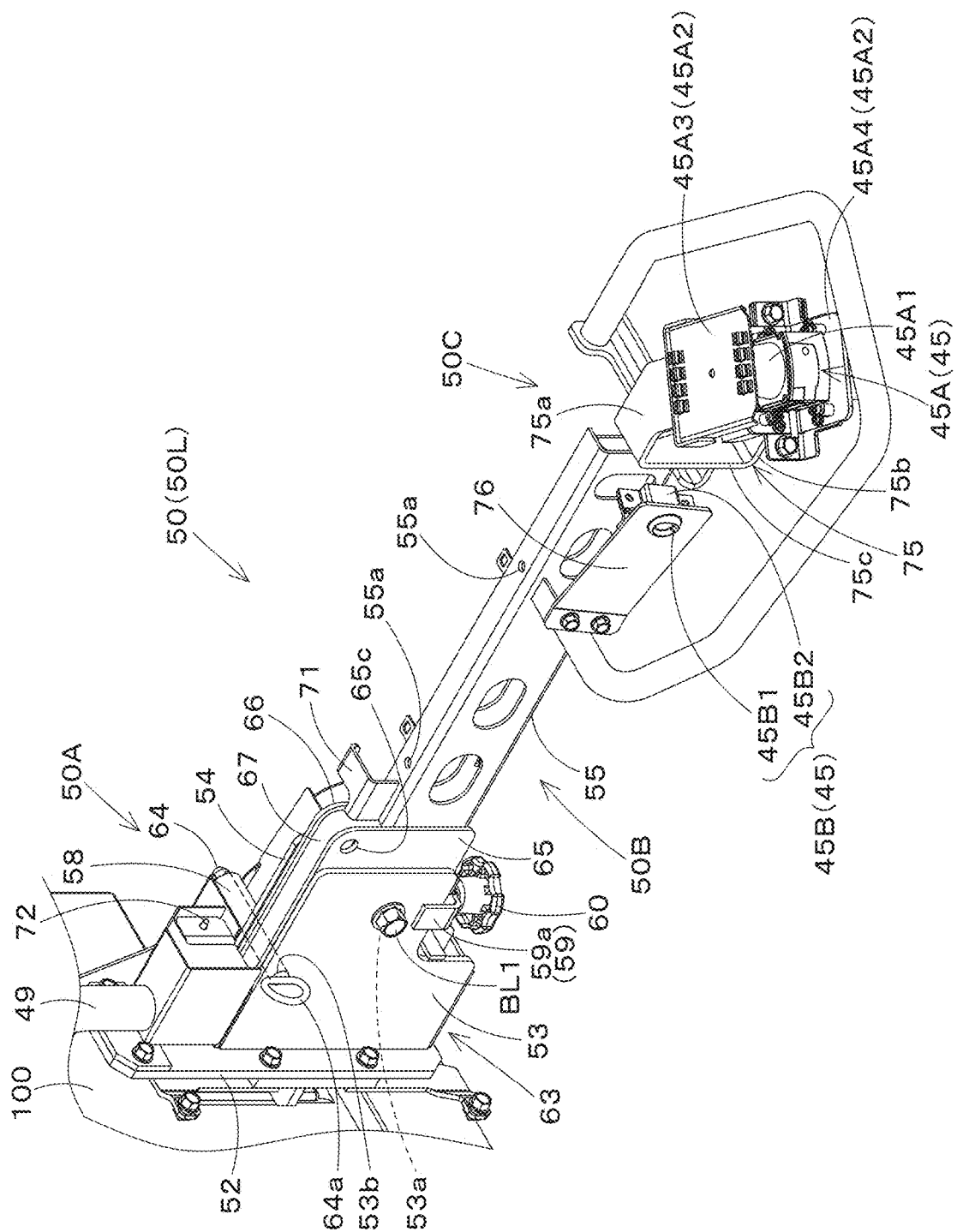
FIG. 10 is a front perspective view of a support, a position changing mechanism, and the like according to the present preferred embodiment of the present invention.

The obstacle detector 45 is a laser scanner 45A, a sonar 45B, and the like. The laser scanner 45A detects an object (obstacle) by emitting laser light as a detection wave. The laser scanner 45A detects the distance to an obstacle based on the time from emission to receipt of laser light. As illustrated in FIGS. 9 and 10, the laser scanner 45A includes a light emitter/receiver 45A1 and a housing 45A2. The light emitter/receiver 45A1 emits laser light and receives the emitted laser light reflected by an obstacle (reflected light). That is, the light emitter/receiver 45A1 includes an emission portion that emits laser light (detection wave) and a receiving portion that receives the laser light (detection wave) reflected by an obstacle. The housing 45A2 is a case that accommodates and holds the light emitter/receiver 45A1. The housing 45A2 includes an upper body 45A3 disposed upward of the light emitter/receiver 45A1 and a lower body 45A4 disposed downward of the light emitter/receiver 45A1. All or part of the space between the upper body 45A3 and the lower body 45A4, that is, the periphery of the light emitter/receiver 45A1 is open, and laser light (detection wave) can pass therethrough.

The sonar 45B detects an object (obstacle) by emitting a sound wave as a detection wave. As illustrated in FIGS. 9 and 10, the sonar 45B includes a sound emitter/receiver 45B1 and a housing 45B2. The sound emitter/receiver 45B1 emits a sound wave and receives the emitted sound wave reflected by an obstacle. That is, the sound emitter/receiver 45B1 includes an emission portion that emits a sound wave (detection wave) and a receiving portion that receives the sound wave (detection wave) reflected by an obstacle. The housing 45B2 is a case that accommodates and holds the sound emitter/receiver 45B1. The sonar 45B detects the distance to an obstacle based on the time from emission to receipt of a sound wave.

As illustrated in FIG. 1, the laser scanner 45A and the sonar 45B are disposed forward of the front wheel 7F and outward of the front wheel 7F. To be more specific, at least the receiving portions (the light emitter/receiver 45A1 and the sound emitter/receiver 45B1) of the laser scanner 45A and the sonar 45B are disposed forward of the front wheel 7F and outward of the front wheel 7F.

Figure 4:
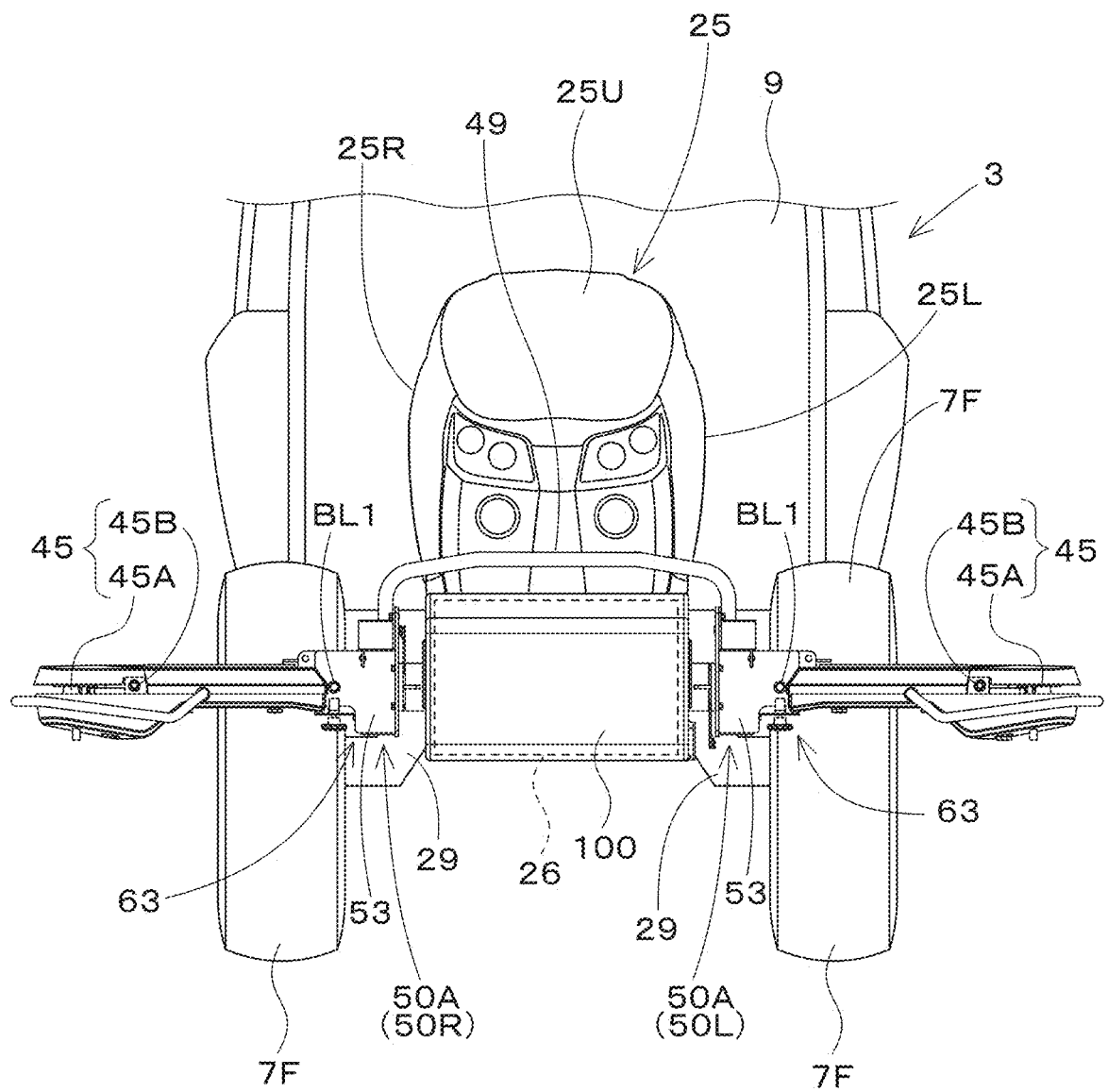
FIG. 4 is a front view of the tractor when an obstacle detector is in a detection position.

As illustrated in FIG. 4, the laser scanner 45A and the sonar 45B are set at positions that are farther downward than the upper wall portion 25U of the hood 25 and lower than an upper end portion of the front wheel 7F. Therefore, the light emitter/receiver 45A1 of the laser scanner 45A and the sound emitter/receiver 45B1 of the sonar 45B are also set at positions that are farther downward than the upper wall portion 25U of the hood 25 and are lower than the upper end portion of the front wheel 7F. The laser scanner 45A (the light emitter/receiver 45A1) and the sonar 45B (the sound emitter/receiver 45B1) are positioned farther downward than the upper end portion the front wheel 7F and further upward than the front axle 15.

As illustrated in FIGS. 1 and 4, the laser scanner 45A is disposed farther outward than the sonar 45B. To be specific, as illustrated in FIG. 1, in a state in which the front wheel 7F is positioned to move the vehicle body 3 straight (a state in which the steering wheel 11a is not steered), the laser scanner 45A (the light emitter/receiver 45A1) is disposed farther outward than an imaginary line X1 that is positioned outward by the width of the front wheel 7F (tread width) from an outer end of the front wheel 7F in the width direction. The sonar 45B is disposed farther inward than the imaginary line X1.

Figure 7:
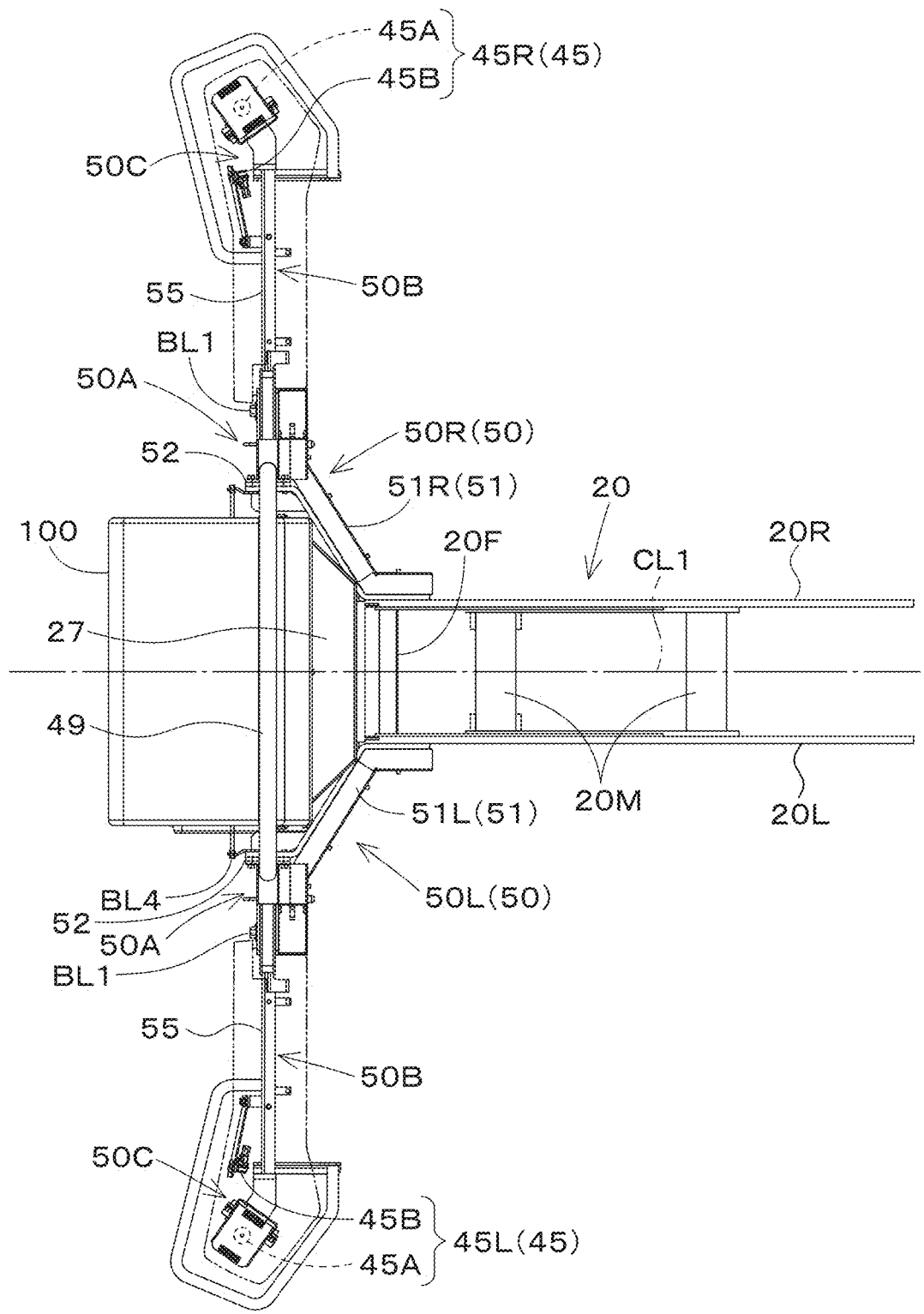
FIG. 7 is a plan view illustrating a cover by an imaginary line when the obstacle detector is in the detection position.
Figure 8:
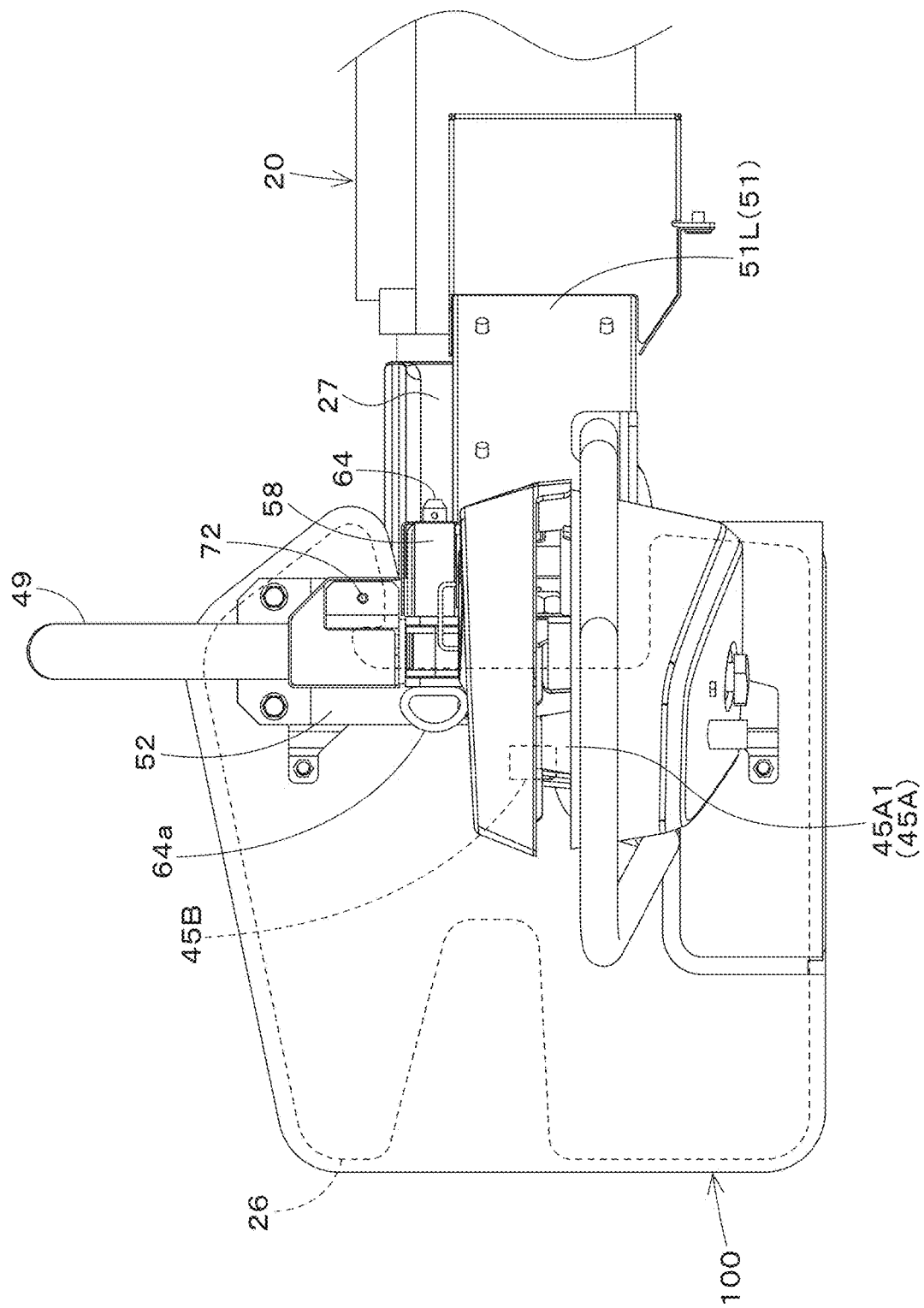
FIG. 8 is a side view of a front portion of the tractor when the obstacle detector is in the detection position.

As illustrated in FIG. 7, the obstacle detector 45 is supported by the vehicle body 3 via a support 50. The support 50 can change the position of the obstacle detector 45 to a detection position (see FIGS. 4 and 15) and to a retracted position (see FIGS. 5 and 16). The support 50 includes a support 50L that supports the obstacle detector 45 leftward of the vehicle body 3 and a support 50R that supports the obstacle detector 45 rightward of the vehicle body 3. The support 50L and the support 50R have the same configuration except that they are symmetric to each other about a center line CL1 in the vehicle-body width direction.

The support 50 extends outward from the vehicle body frame (front axle frame) 20. To be specific, the support 50L extends leftward from the vehicle body frame 20L. The support 50R extends rightward from the vehicle body frame 20R.

As illustrated in FIGS. 7, 10, 11, and 13, the support 50 has a first support portion 50A, a second support portion 50B, and a third support portion 50C.

The first support portion 50A has an attachment arm 51, an attachment plate 52, a front support plate 53, and a back support plate 54. The attachment arm 51 extends forward and outward from a front side part of the vehicle body frame 20. The attachment arm 51 includes an attachment arm 51L and an attachment arm 51R. The attachment arm 51L is attached to a front portion of a left side surface of the vehicle body frame 20L, and extends leftward and forward from the front portion. The attachment arm 51R is attached to a front portion of a right side surface of the vehicle body frame 20R, and extends rightward and forward from the front portion. The attachment plate 52 is attached to a front end portion of each of the attachment arms 51L and 51R, and one surface thereof faces outward and the other surface thereof faces inward. The attachment plate 52 on the left side, which is attached to the attachment arm 51L, and the attachment plate 52 on the right side, which is attached to the attachment arm 51R, are coupled via a coupling 49. The coupling 49 is formed from a pipe, extends through a space above the weight cover 100, and couples an upper portion of the attachment plate 52 on the left side and an upper portion of the attachment plate 52 on the right side.

Figure 12:
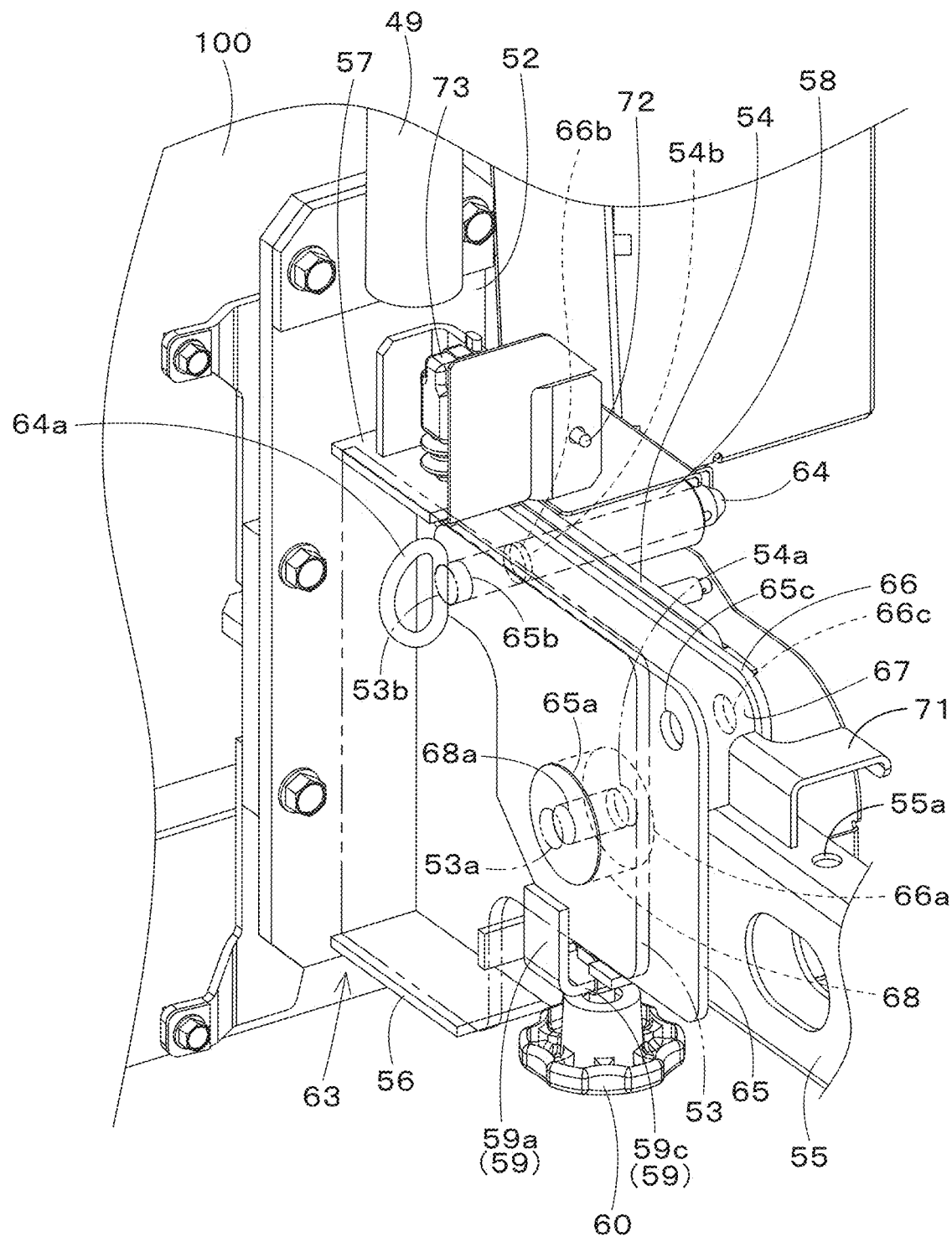
FIG. 12 is a front perspective view of the position changing mechanism and the like according to the present preferred embodiment of the present invention.
Figure 13:
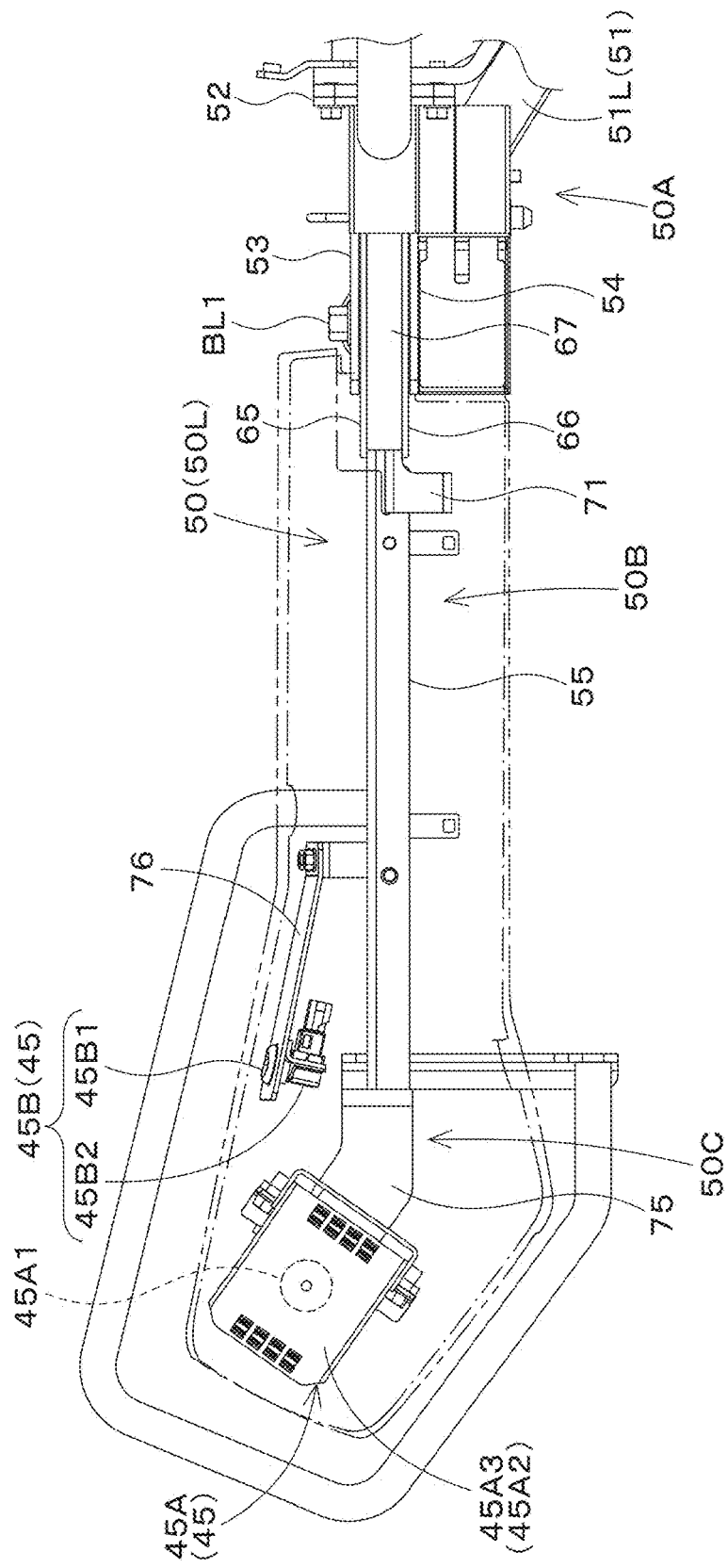
FIG. 13 is a plan view of the support, a handle, and the like according to the present preferred embodiment of the present invention.

The front support plate 53 and the back support plate 54 have the same shape, and are disposed parallel to each other and so as to face each other with a distance therebetween in the front-back direction. The front support plate 53 and the back support plate 54 are attached to one surface of the attachment plate 52 and extend outward. As illustrated in FIG. 12, a lower support plate 56 is in contact with a lower edge of the front support plate 53 and a lower edge of the back support plate 54. An upper support plate 57 is in contact with an upper edge of the front support plate 53 and an upper edge of the back support plate 54. The lower support plate 56 and the upper support plate 57 are fixed to the attachment plate 52. In FIG. 12, the front support plate 53 is shown by an imaginary line.

Figure 11:
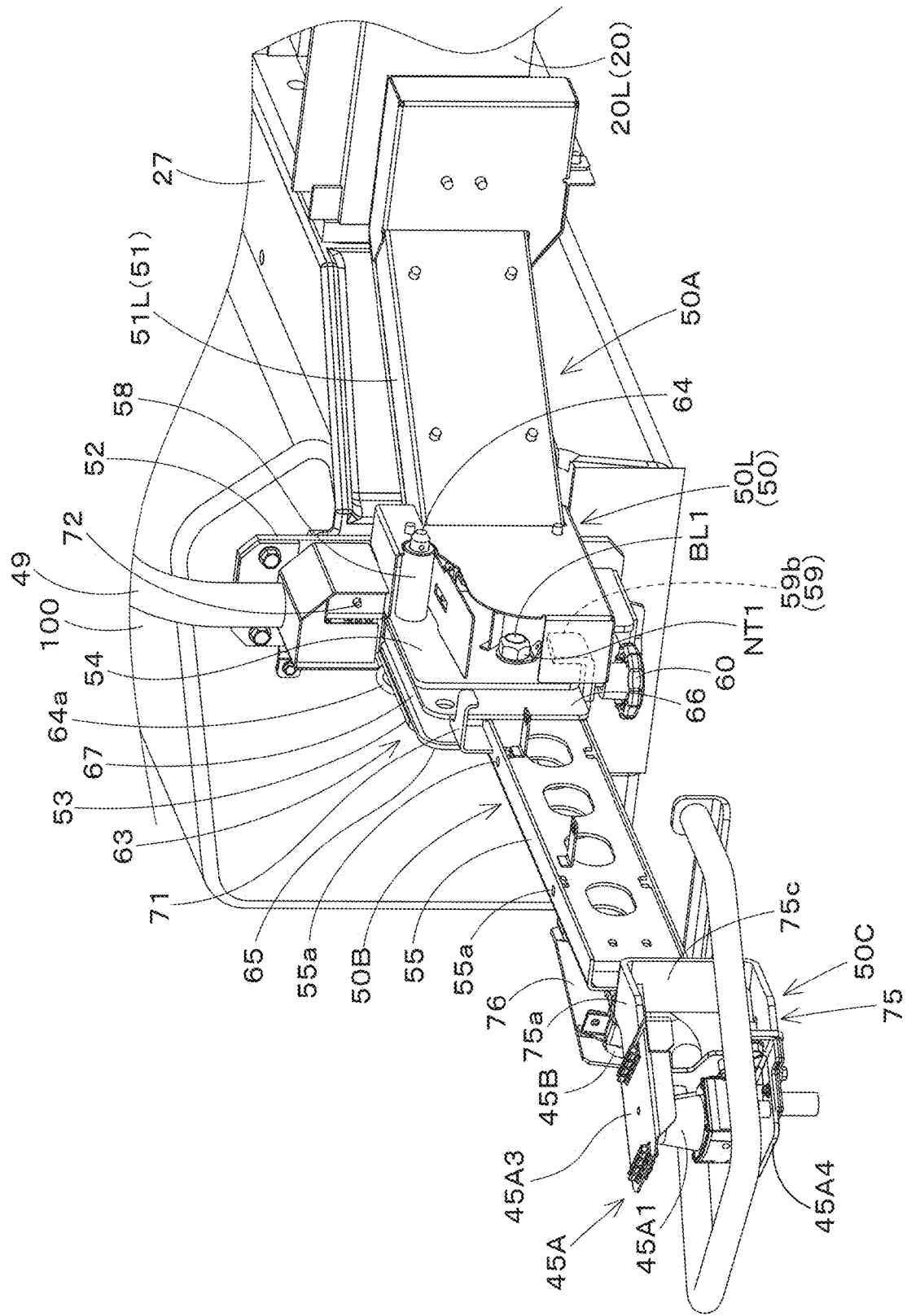
FIG. 11 is a rear perspective view of the support, the position changing mechanism, and the like according to the present preferred embodiment of the present invention.
Figure 14:
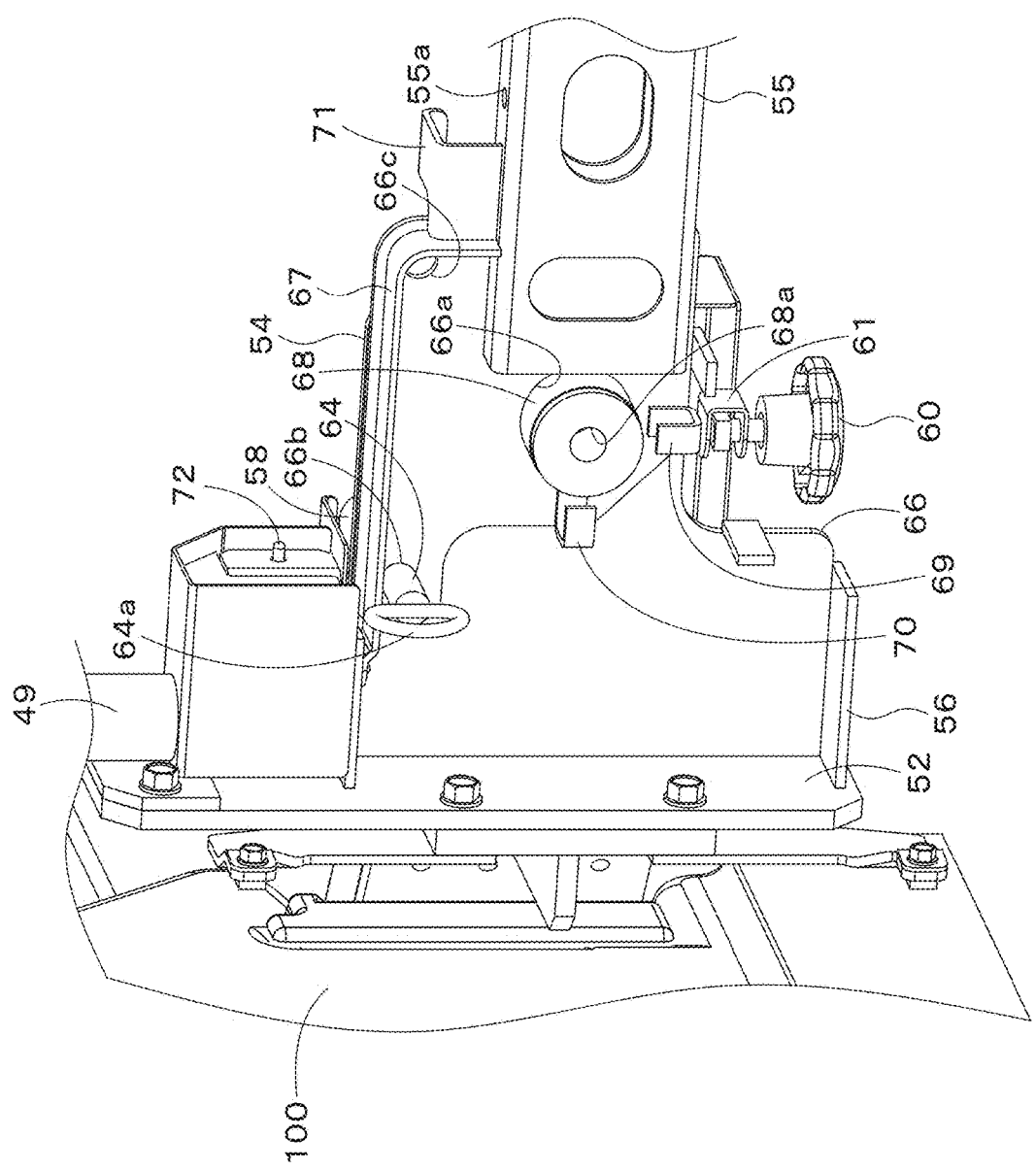
FIG. 14 is a front perspective view of the position changing mechanism and the like according to the present preferred embodiment of the present invention from which a front support plate and a one-side plate are omitted.

As illustrated in FIGS. 10 and 12, a first front hole 53a and a second front hole 53b are located in the front support plate 53. A first back hole 54a and a second back hole 54b are located the back support plate 54. The first back hole 54a is at a position facing the first front hole 53a, and the second back hole 54b is at a position facing the second front hole 53b. As illustrated in FIGS. 10, 11, and 12, a tubular body 58 and a receiver 59 are fixed to an upper portion of the back support plate 54. The tubular body 58 has a central hole whose axial direction extends in the front-back direction. The axis of the central hole of the tubular body 58 and the center of the second back hole 54b are disposed on the same straight line. The receiver 59 is fixed to a lower portion of the front support plate 53 and a lower portion of the back support plate 54. The receiver 59 is a U-shaped member, and has a front portion 59a fixed to a front surface of the front support plate 53, a back portion 59b fixed to a back surface of the back support plate 54, and a lower portion 59c connecting the front portion 59a and the back portion 59b. A knob bolt 60 is screwed into the lower portion 59c of the receiver 59. The axis of the threaded shaft of the knob bolt 60 is oriented in the up-down direction. As illustrated in FIG. 14, a distal end member 61 is attached to the threaded shaft of the knob bolt 60. The position (height) of the distal end member 61 can be adjusted by rotating the knob bolt 60.

As illustrated in FIGS. 10, 11, 12, and other figures, the second support portion 50B is supported between the front support plate 53 and the back support plate 54. The second support portion 50B has a one-side plate 65, an other-side plate 66, a coupling plate 67, and a support arm 55.

The one-side plate 65 and the other-side plate 66 have the same shape, and are disposed parallel to each other and so as to face each other with a distance therebetween in the front-back direction. The one-side plate 65 faces the front support plate 53, and the other-side plate 66 faces the back support plate 54. As illustrated in FIG. 12, a first one-side hole 65a, a second one-side hole 65b, and a third one-side hole 65c are formed in the one-side plate 65. As illustrated in FIGS. 12 and 14, a first other-side hole 66a, a second other-side hole 66b, and a third other-side hole 66c are formed in the other-side plate 66. The first other-side hole 66a is at a position facing the first one-side hole 65a. The second other-side hole 66b is at a position facing the second one-side hole 65b. The third other-side hole 66c is at a position facing the third one-side hole 65c. In FIG. 14, the front support plate 53 and the one-side plate 65 are omitted. The coupling plate 67 is a strip-shaped plate bent into an L-shape, and couples the one-side plate 65 and the other-side plate 66.

As illustrated in FIGS. 12 and 14, a cylindrical boss 68 is fitted into the first one-side hole 65a and the first other-side hole 66a. To be specific, a front end portion of the boss 68 is fitted into the first one-side hole 65a, and the back end portion of the boss 68 is fitted into the first other-side hole 66a. A central hole 68a of the boss 68, the first front hole 53a, and the first back hole 54a are disposed on the same straight line, and a threaded shaft of a bolt BL1 (see FIGS. 13 and 11) is inserted so as to extend through these holes. A nut NT1 is screwed onto the threaded shaft of the bolt BL1. With the bolt BL1 and the nut NT1, the second support portion 50B (the one-side plate 65, the other-side plate 66, the coupling plate 67) is interposed and supported between the front support plate 53 and the back support plate 54. The second support portion 50B is rotatable relative to the first support portion 50A with the threaded shaft of the bolt BL1 as a supporting point. In other words, the threaded shaft of the bolt BL1 functions as a support shaft that rotatably supports the second support portion 50B.

Figure 15:
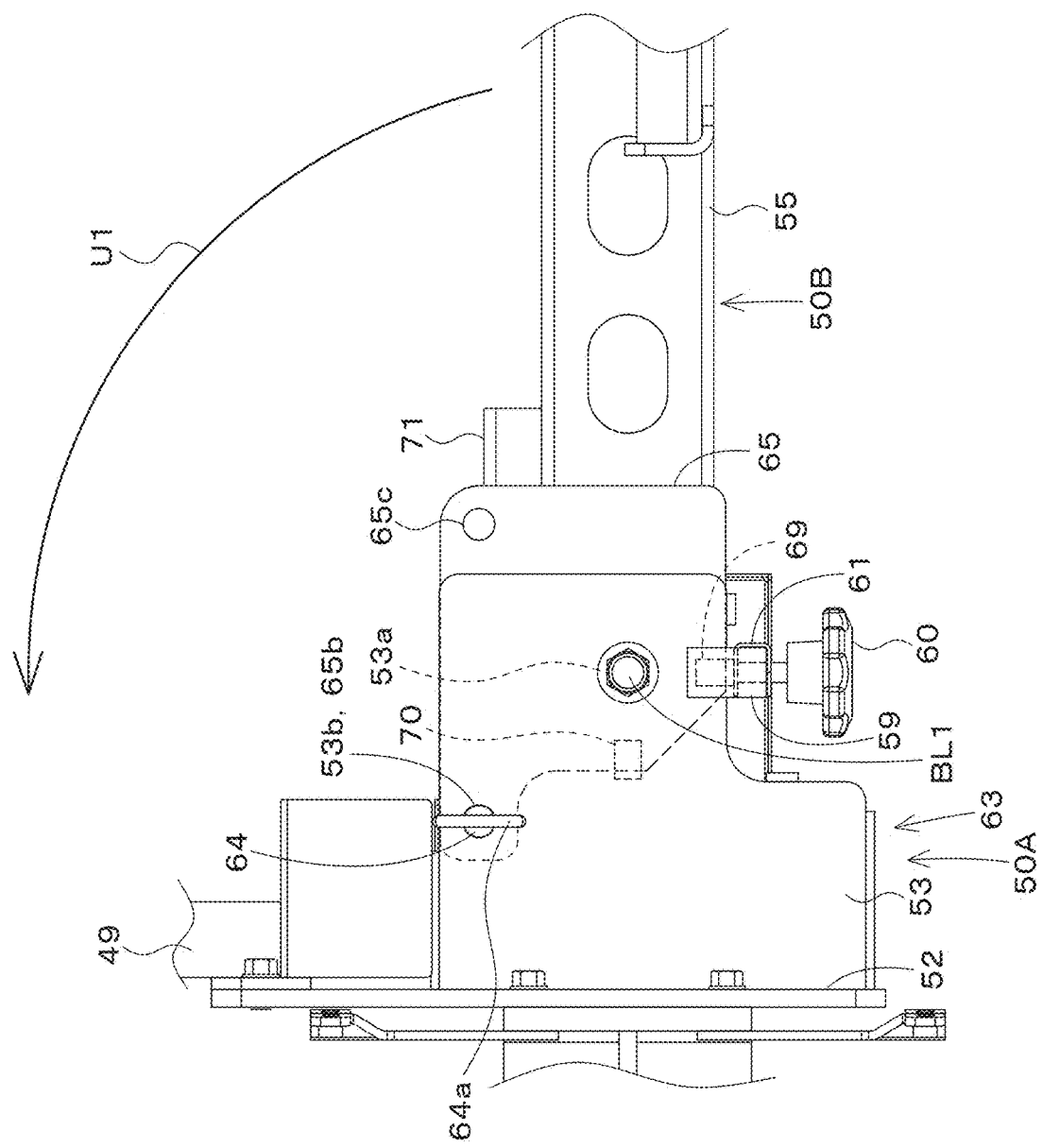
FIG. 15 is a front view of the position changing mechanism and the like when the obstacle detector according to the present preferred embodiment of the present invention is in a detection position.

As illustrated in FIGS. 14 and 15, a first contact member 69 and a second contact member 70 are fixed between the one-side plate 65 and the other-side plate 66. The first contact member 69 and the second contact member 70 are disposed on the same circle that is centered on a support shaft (the threaded shaft of the bolt BL1). That is, the first contact member 69 and the second contact member 70 are equidistant from the support shaft (the threaded shaft of the bolt BL1). The first contact member 69 and the second contact member 70 are disposed at positions that are separated by 90° around the support shaft (the threaded shaft of the bolt BL1).

As illustrated in FIGS. 10 and 11, the support arm 55 extends from the first support portion 50A outward of the vehicle body. One end portion of the support arm 55 and an abutting member 71 described below are connected to the coupling plate 67. The third support portion 50C is connected to the other end portion of the support arm 55.

The third support portion 50C supports the obstacle detector 45. As illustrated in FIGS. 10 and 11 and other figures, the third support portion 50C has a support bracket 75 and a support stay 76. The support bracket 75 supports the laser scanner 45A. The support bracket 75 is a substantially C-shaped member including an upper horizontal portion 75a, a lower horizontal portion 75b, and a vertical portion 75c. The vertical portion 75c is fixed to the other end portion of the support arm 55. The upper horizontal portion 75a supports the upper body 45A3 of the housing 45A2. The lower horizontal portion 75b supports the lower body 45A4 of the housing 45A2. Thus, the laser scanner 45A is supported by the support bracket 75. The support stay 76 is fixed to a middle portion of the support arm 55 and supports the sonar 45B. The sonar 45B is attached to the support stay 76 so that the sound emitter/receiver 45B1 faces forward and inward of the vehicle body.

The attachment plate 52, the front support plate 53, the back support plate 54 (see FIGS. 10 to 12 and other figures), and the like of the first support portion 50A described above are included in a position changing mechanism 63 that changes the position of the obstacle detector 45. The position changing mechanism 63 is a mechanism that changes the position of the obstacle detector 45 to a detection position that is a predetermined position to detect an obstacle and to a retracted position that is retracted from the detection position toward the vehicle body 3. The position changing mechanism 63, together with the second support portion 50B and the third support portion 50C of the support 50, can change the position of the obstacle detector 45.

Figure 5:
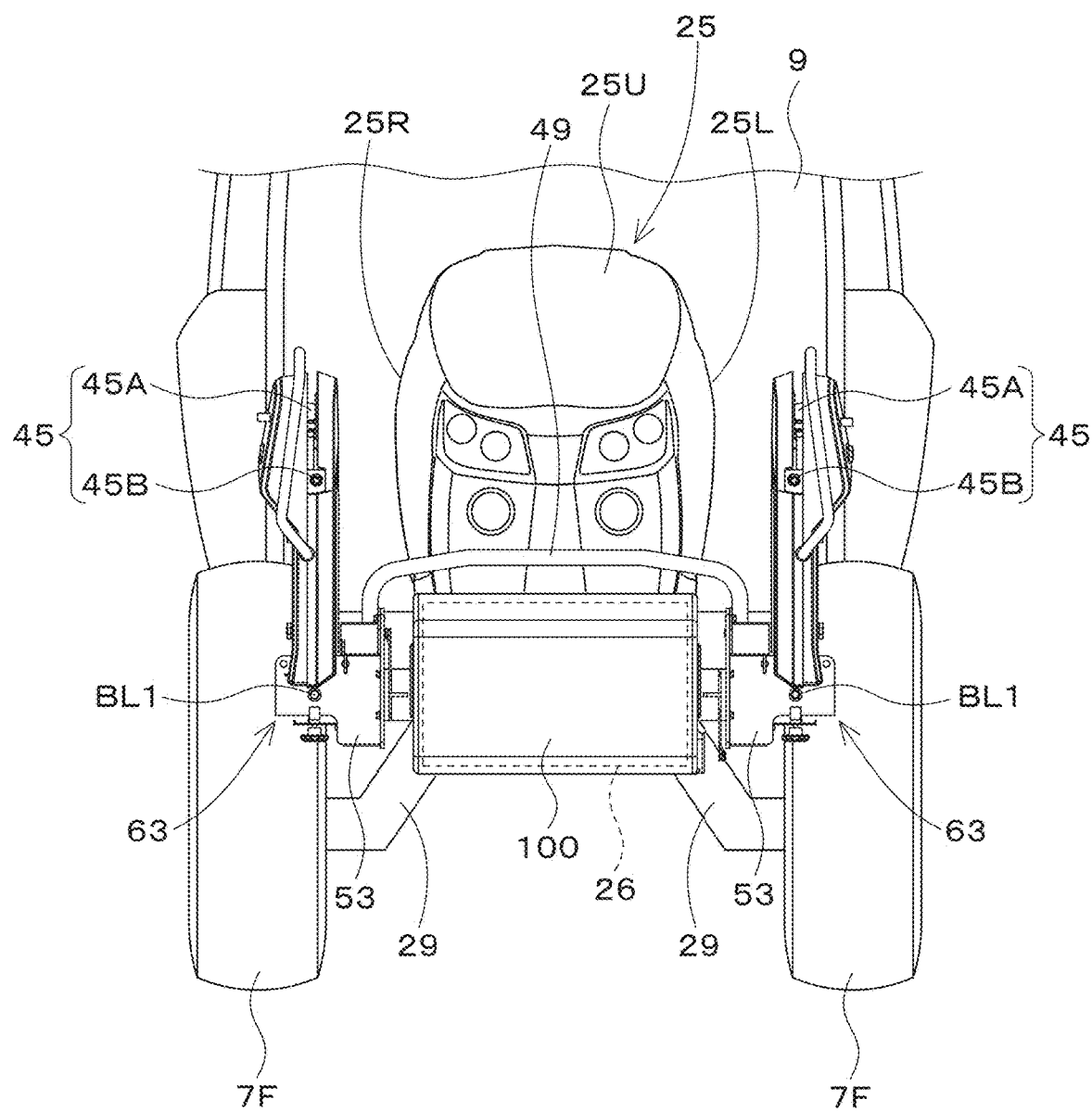
FIG. 5 is a front view of the tractor when the obstacle detector is in a retracted position.
Figure 16:
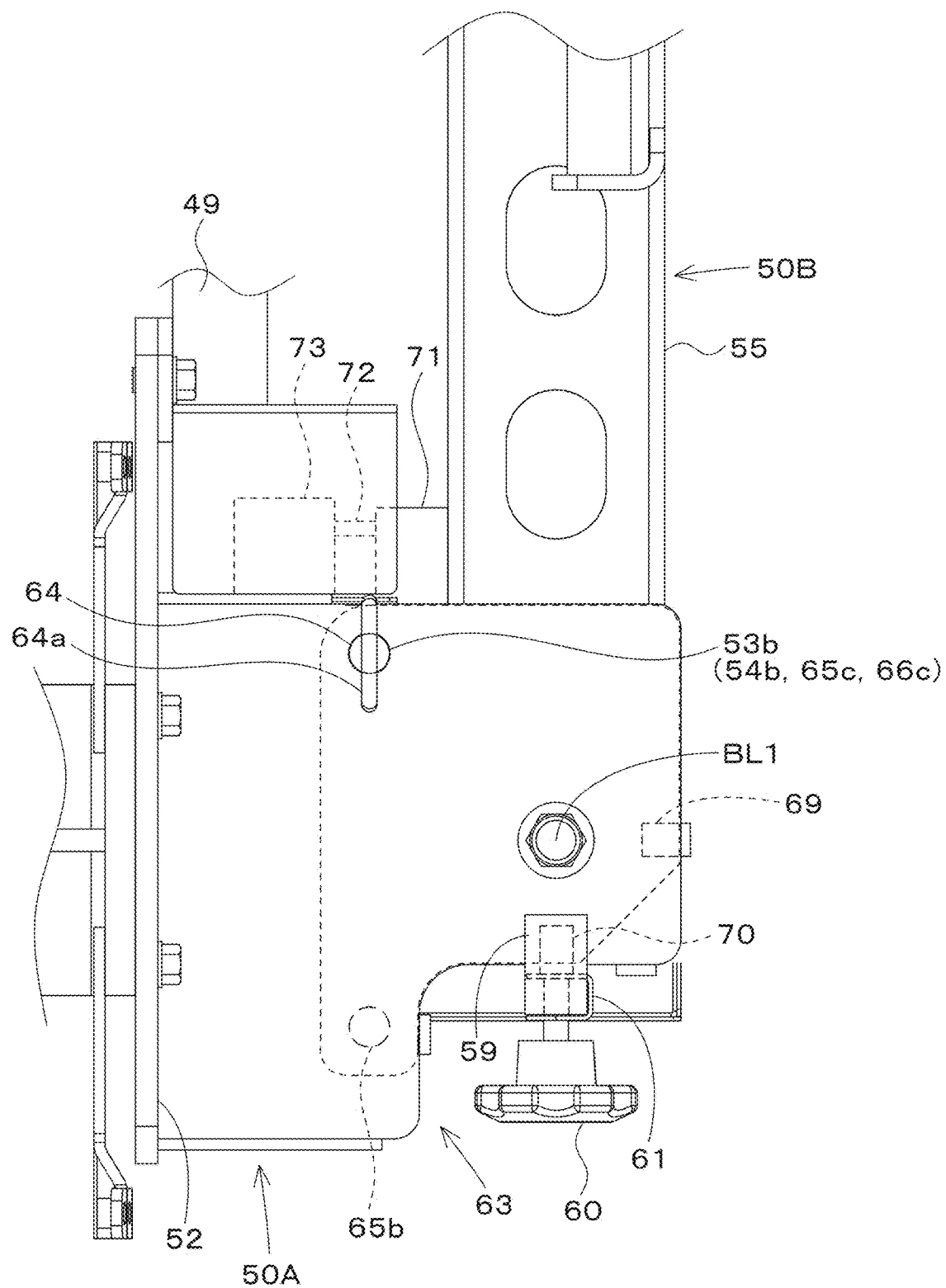
FIG. 16 is a front view of the position changing mechanism and the like when the obstacle detector according to the present preferred embodiment of the present invention is in a retracted position.

FIGS. 4 and 15 illustrate a state in which the obstacle detector 45 is in the detection position. FIGS. 5 and 16 illustrate a state in which the obstacle detector 45 is in the retracted position. The change in the position of the obstacle detector 45 between the detection position and retracted position can be performed by rotating the second support portion 50B relative to the first support portion 50A with the threaded shaft of the bolt BL1 (support shaft) as a supporting point.

As illustrated in FIG. 15, when the obstacle detector 45 is in the detection position, the support arm 55 extends in a horizontal direction. To be specific, the support arm 55 of the support 50L, which supports the obstacle detector 45 leftward of the vehicle body 3, extends horizontally leftward. The support arm 55 of the support 50R, which supports the obstacle detector 45 rightward of the vehicle body 3, extends horizontally rightward. When the obstacle detector 45 is in the detection position, the emission direction of laser light emitted from the light emitter/receiver 45A1 is the horizontal direction.

When the obstacle detector 45 is in the detection position, as illustrated in FIG. 12, the second front hole 53b, the second one-side hole 65b, the second other-side hole 66b, and the second back hole 54b are disposed on the same straight line, and a pin 64 is inserted so as to extend through these holes and the tubular body 58. By inserting the pin 64 through the second front hole 53b, the second one-side hole 65b, the second other-side hole 66b, and the second back hole 54b, the second support portion 50B (the one-side plate 65, the other-side plate 66, the coupling plate 67, the support arm 55) becomes non-rotatable relative to the front support plate 53 and the back support plate 54, and the position of the second support portion 50B is fixed. As a result, as illustrated in FIGS. 4, 14, and 15, the support arm 55 is positioned relative to the vehicle body 3 in a state of extending in a horizontal direction (detection posture), and the obstacle detector 45 is held in the detection position. At this time, the distal end member 61, which is attached to the threaded shaft of the knob bolt 60, is in contact with the first contact member 69.

To change the position of the obstacle detector 45 from the detection position (see FIG. 15) to the retracted position (see FIG. 16), first, the pin 64 is pulled out from the holes. The pin 64 can be pulled out by gripping a grip portion 64a provided at an end portion of the pin 64. By pulling out the pin 64 from the holes, the second support portion 50B (the one-side plate 65, the other-side plate 66, the coupling plate 67, the support arm 55) becomes rotatable relative to the front support plate 53 and the back support plate 54. At this time, because the distal end member 61 is in contact with the first contact member 69, the second support portion 50B cannot rotate downward and can rotate only upward.

After pulling out the pin 64 from the holes, when an upward force is applied to the support arm 55, the second support portion 50B (the one-side plate 65, the other-side plate 66, the coupling plate 67, the support arm 55) rotates upward with the support shaft (the threaded shaft of the bolt BL1) as a supporting point (see arrow U1 in FIG. 15). The upward rotational range of the support arm 55 is defined by the abutting member 71 and a protruding shaft 72 (see FIGS. 12 and 14). The abutting member 71 is fixed to an upper portion of the support arm 55. The protruding shaft 72 protrudes outward from a shaft supporter 73 disposed on an upper portion of the upper support plate 57.

As illustrated in FIG. 16, the support arm 55 can be rotated upward until the abutting member 71 comes into contact with the protruding shaft 72. When the abutting member 71 is in contact with the protruding shaft 72, the support arm 55 is in a state of extending upward (retracted position). In a state illustrated in FIG. 16, the second front hole 53b, the second back hole 54b, the third one-side hole 65c, and the third other-side hole 66c are disposed on the same straight line. Therefore, by inserting the pin 64 through these holes and the tubular body 58, the second support portion 50B (the one-side plate 65, the other-side plate 66, the coupling plate 67, the support arm 55) becomes non-rotatable relative to the front support plate 53 and the back support plate 54, and the position of the second support portion 50B is fixed. As a result, as illustrated in FIGS. 16 and 5, the support arm 55 is positioned relative to the vehicle body 3 in a state of extending upward, and the obstacle detector 45 is held in the retracted position. At this time, the distal end member 61, which is attached to the threaded shaft of the knob bolt 60, is in contact with the second contact member 70.

As described above, with the position changing mechanism 63, it is possible to change the position of the obstacle detector 45 to the detection position and to the retracted position. When in the detection position, the obstacle detector 45 can detect an obstacle around the vehicle body 3. When the obstacle detector 45 is not to be used, the obstacle detector 45 is moved from the detection position to the retracted position.

The position changing mechanism 63 has a posture detector to detect whether the support arm 55 is in the detection position or in the retracted position. As the posture detector, for example, a detector that detects the retracted position when the abutting member 71 in contact with the protruding shaft 72 and detects the detection position when the abutting member 71 is separated from the protruding shaft 72 is used. The detection information of the posture detector is input to the controller 40.

Hereafter, an effective mode and an ineffective mode will be described. In autonomous travel of the tractor 1, when the obstacle detector 45 detects an obstacle, the autonomous travel controller 40A stops the vehicle body 3 based on detection information about the obstacle detected by the obstacle detector. During autonomous travel in the agricultural field H1, it is possible to switch between an effective mode in which stopping of the vehicle body 3 is performed based on the detection information and an ineffective mode in which stopping of the vehicle body 3 is not performed.

In the effective mode, when autonomous travel is being performed, if the obstacle detector 45 detects an obstacle and the detected detection information indicates that the distance between the obstacle and the vehicle body 3 is less than or equal to a predetermined distance, the vehicle body 3 is stopped. On the other hand, in the ineffective mode, when autonomous travel is being performed, even if the obstacle detector 45 detects an obstacle and the detected detection information indicates that the distance between the obstacle and the vehicle body 3 is less than or equal to a predetermined distance, the vehicle body 3 is not stopped and autonomous travel is continued. Alternatively, in the ineffective mode, when autonomous travel is being performed, even if the obstacle detector 45 detects an obstacle, the detection of the obstacle (detection information) is not output to the autonomous travel controller 40A, and thus stopping of the vehicle body 3 by the autonomous travel controller 40A is not performed. Further alternatively, in the ineffective mode, when autonomous travel is being performed, the obstacle detector 45 stops detection of an obstacle, and thus stopping of the vehicle body 3 is not performed. That is, in the ineffective mode, in autonomous travel in the agricultural field H1, stopping of the vehicle body 3 based on detection information of the obstacle detector 45 is not performed irrespective of whether or not an obstacle is detected.

Figure 18:
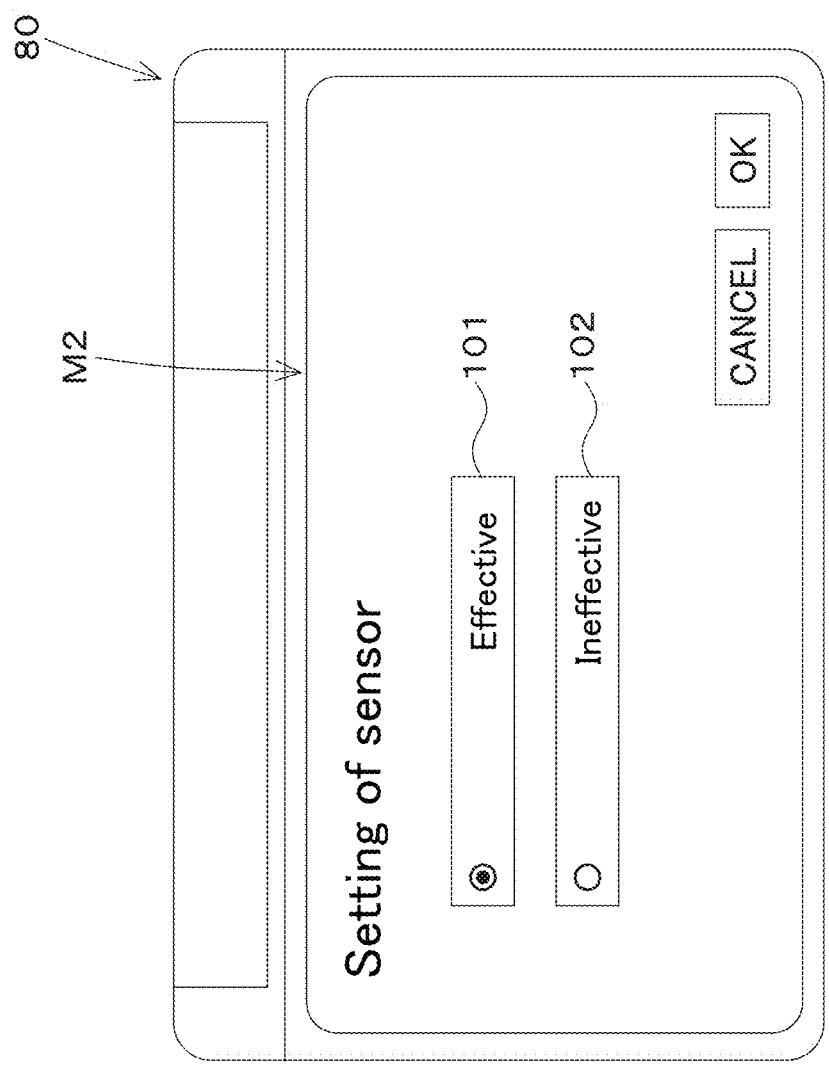
FIG. 18 illustrates an example of a setting screen according to the present preferred embodiment of the present invention.

The controller 40 includes a mode switch 40B. The mode switch 40B includes an electric/electronic circuit provided in the controller 40, a program stored in the controller 40, and the like. As illustrated in FIG. 18, when an operator performs a predetermined operation on the display 80, the mode switch 40B displays a setting screen M2. The setting screen M2 displays a first selecting portion 101 to select the effective mode and a second selecting portion 102 to select the ineffective mode. Selection between the first selecting portion 101 and the second selecting portion 102 can be performed by using an operation member provided in the display 80 or an operation member provided around the operator's seat 10. The mode switch 40B switches to the effective mode when the first selecting portion 101 is selected, and switches to the ineffective mode when the second selecting portion 102 is selected.

To be more specific, when the ignition switch 42 is OFF or in a state in which the ignition switch 42 is switched from OFF to ON, the mode switch 40B sets the effective mode as a default. In the default state (initial state), the display 80 displays on the setting screen M2 a state in which the first selecting portion 101 is selected. That is, in a state in which driving of the prime mover 4 is stopped or in a state in which the prime mover 4 is restarted after stopped being driven, the mode switch 40B sets the effective mode as a default.

On the other hand, after driving the prime mover 4, when switching from the effective mode to the ineffective mode is performed on the setting screen M2, and if driving of the prime mover 4 is stopped, the mode switch 40B switches from the ineffective mode to the effective mode. That is, in a state in which the ignition switch 42 is switched from ON to OFF in a state in which the ineffective mode is maintained, the mode switch 40B switches to the effective mode.

In the preferred embodiments described above, the mode switch 40B performs switching between the effective mode and the ineffective mode in accordance with an operation on the setting screen M2 displayed on the display 80. However, switching between the modes may be restrained.

The controller 40 includes a switch restraint 40C. The switch restraint 40C includes an electric/electronic circuit provided in the controller 40, a program stored in the controller 40, and the like. When the obstacle detector 45 is in the retracted position, the switch restraint 40C allows the mode switch 40B to switch from the effective mode to the ineffective mode. For example, in a state in which the setting screen M2 is displayed on the display 80, when the obstacle detector 45 is in the retracted position, the switch restraint 40C allows (permits) the mode switch 40B to switch from the effective mode to the ineffective mode due to selection of the second selecting portion 102.

On the other hand, in a state in which the setting screen M2 is displayed on the display 80, when the obstacle detector 45 is in the detection position, the switch restraint 40C does not allow (permit) the mode switch 40B to switch from the effective mode to the ineffective mode due to selection of the second selecting portion 102. That is, when the obstacle detector 45 is in the detection position, the switch restraint 40C does not permit the mode switch 40B to accept selection of the second selecting portion 102.

In the preferred embodiments described above, if the obstacle detector 45 is in the detection position, the switch restraint 40C does not allow switching from the effective mode to the ineffective mode. Instead, restraint of the ineffective mode may be performed based on whether or not the operator's seat is occupied by an operator.

To be specific, the controller 40 includes a switch restraint 40D. The switch restraint 40D includes an electric/electronic circuit provided in the controller 40, a program stored in the controller 40, and the like.

When the seat-occupation detector 43 is detecting that the operator's seat is occupied, the switch restraint 40D allows the mode switch 40B to switch from the effective mode to the ineffective mode. For example, in a state in which the setting screen M2 is displayed on the display 80, when the operator's seat is occupied by an operator, the switch restraint 40D allows (permits) the mode switch 40B to switch from the effective mode to the ineffective mode due to selection of the second selecting portion 102.

On the other hand, in a state in which the setting screen M2 is displayed on the display 80, when the seat-occupation detector 43 is detecting that the operator's seat is not occupied, the switch restraint 40D does not allow the mode switch 40B to switch from the effective mode to the ineffective mode due to selection of the second selecting portion 102. That is, when the operator's seat 10 is not occupied by an operator, the switch restraint 40D does not allow the mode switch 40B to accept selection of the second selecting portion 102.

Figure 19A:
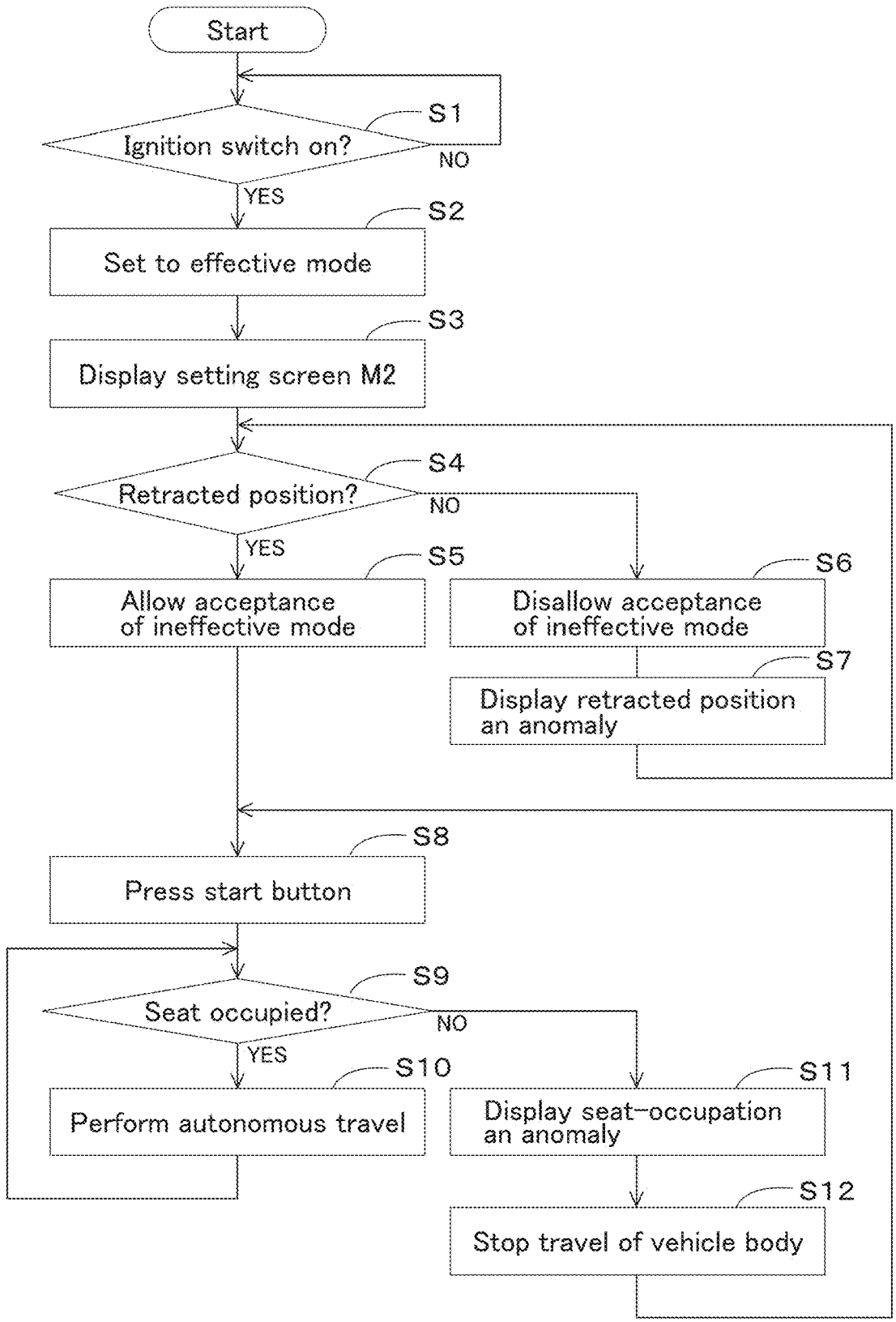
FIG. 19A illustrates an operation flow of autonomous travel according to the present preferred embodiment of the present invention.

Hereafter, a first example of an autonomous travel flow will be described. FIG. 19A illustrates an operation flow of autonomous travel. In FIG. 19A, it is assumed that autonomous travel is not performed immediately after the ignition switch 42 is turned ON. FIG. 19A is an operation flow of autonomous travel in the ineffective mode.

As illustrated in FIG. 19A, the mode switch 40B determines whether or not the ignition switch 42 is ON (S1). For example, if the ignition switch 42 is ON (if the prime mover 4 is being driven or electric power is being supplied to electric components) (S1, Yes), the mode switch 40B sets to the effective mode (S2). When a predetermined operation is performed, the display 80 displays the setting screen M2 (S3). The switch restraint 40C determines whether or not the obstacle detector 45 is in the retracted position (S4). If the obstacle detector 45 is in the retracted position (S4, Yes), the switch restraint 40C allows the mode switch 40B to switch from the effective mode to the ineffective mode on the setting screen M2, and accepts the ineffective mode (S5).

On the other hand, if the obstacle detector 45 is not in the retracted position (S4, No), the switch restraint 40C does not allow the mode switch 40B to switch from the effective mode to the ineffective mode on the setting screen M2, and does not accept the ineffective mode (S6). In addition, if the obstacle detector 45 is not in the retracted position (S4, No), the autonomous travel controller 40A outputs an anomaly (alarm) to the display 80, and the display 80 displays on the setting screen M2 or the like an anomaly (alarm) indicating that the obstacle detector 45 is not in the retracted position (S7).

After accepting the ineffective mode (in and after S5), the autonomous travel controller 40A waits for acquisition of a start command to start autonomous travel. When a start button of the remote control 81, the switch 82, or the like is pressed and the start command is acquired (S8), the autonomous travel controller 40A determines whether or not the operator's seat is occupied by an operator (S9). If the operator's seat 10 is occupied by an operator (S9, Yes), the autonomous travel controller 40A performs autonomous travel control, that is, starts autonomous travel in the ineffective mode (S10).

When autonomous travel is started in the ineffective mode, the autonomous travel controller 40A does not perform stopping of the vehicle body 3 due to detection of an obstacle, irrespective of the detection information of the obstacle detector 45. As illustrated in FIG. 20, when autonomous travel is being performed in the ineffective mode, the display 80 displays in a message portion 88 that autonomous travel in the ineffective mode is being performed. The display 80 may display in the message portion 88 that autonomous travel in the effective mode is being performed.

On the other hand, if the operator's seat is not occupied by an operator (S9, No), the autonomous travel controller 40A outputs an anomaly (alarm) to the display 80, and displays on the display 80 an anomaly (alarm) indicating that the operator's seat is not occupied (S11). Before starting autonomous travel and if the operator's seat is not occupied (S8 to S9, when the process proceeds to No), the autonomous travel controller 40A prohibits autonomous travel. On the other hand, when autonomous travel is being performed and the operator's seat is not occupied (S10 to S9, when the process proceeds to No), the autonomous travel controller 40A stops travel of the vehicle body 3 (S12). If the operator's seat is occupied when autonomous travel is being performed after starting autonomous travel (S10 to S9, when the process proceeds to Yes), the autonomous travel controller 40A continues autonomous travel.

Figure 19B:
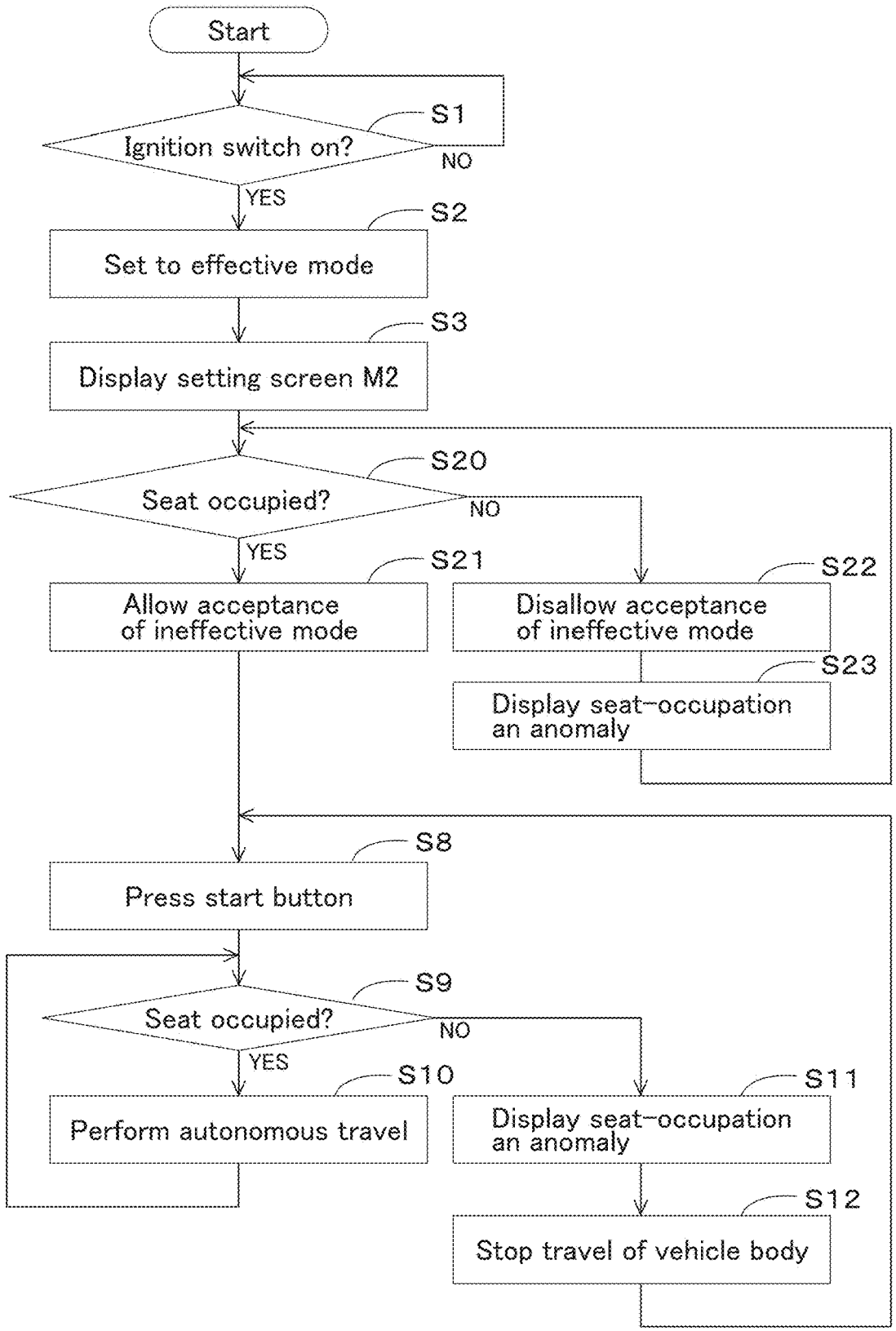
FIG. 19B illustrates an operation flow of autonomous travel according to the present preferred embodiment of the present invention different from that of FIG. 19A.

Hereafter, a second example of an autonomous travel flow will be described. FIG. 19B illustrates an operation flow of autonomous travel different from that of FIG. 19A. Also in FIG. 19B, it is assumed that autonomous travel is not performed immediately after the ignition switch 42 is turned ON. FIG. 19B is an operation flow of autonomous travel in the ineffective mode.

As illustrated in FIG. 19B, the mode switch 40B determines whether or not the ignition switch 42 is ON (S1). For example, if the ignition switch 42 is ON (if the prime mover 4 is being driven or electric power is being supplied to electric components) (S1, Yes), the mode switch 40B sets to the effective mode (S2). When a predetermined operation is performed, the display 80 displays the setting screen M2 (S3). The switch restraint 40D determines whether or not the operator's seat is occupied by an operator (S20). If the operator's seat is occupied by an operator (S20, Yes), the switch restraint 40D allows the mode switch 40B to switch from the effective mode to the ineffective mode on the setting screen M2, and accepts the ineffective mode (S21).

On the other hand, if the operator's seat is not occupied by an operator (S20, No), the switch restraint 40D does not allow the mode switch 40B to switch from the effective mode to the ineffective mode on the setting screen M2, and does not accept the ineffective mode (S22). In addition, if the operator's seat is not occupied by an operator (S20, No), the autonomous travel controller 40A outputs an anomaly (alarm) to the display 80, and the display 80 displays on the setting screen M2 or the like an anomaly (alarm) indicating that the operator's seat is not occupied by an operator (S23). Descriptions of S8 to S12 in 19B, which are similar to those of FIG. 19A, will be omitted.

In the preferred embodiments described above, switching from the effective mode to the ineffective mode is allowed if the obstacle detector 45 is in the retracted position or if the operator's seat is occupied by an operator. However, switching from the effective mode to the ineffective mode may be allowed if the obstacle detector 45 is in the retracted position and the operator's seat is occupied by an operator.

Hereafter, a third example of an autonomous travel flow will be described. In the preferred embodiments described above, switching from the effective mode to the ineffective mode is restrained based on the position of the obstacle detector 45 (detection position, retracted position) or the state of the operator's seat (occupied, not occupied). However, switching from the effective mode to the ineffective mode may be performed irrespective of the position of the obstacle detector 45 and the state of the operator's seat. In addition, whether or not to allow starting of autonomous travel may be set based on the position of the obstacle detector 45. For example, before autonomous travel, when in the ineffective mode, the autonomous travel controller 40A can start autonomous travel if the obstacle detector 45 is in the retracted position, and, when in the ineffective mode, the autonomous travel controller 40A does not start autonomous travel if the obstacle detector 45 is not in the retracted position.

Figure 19C:
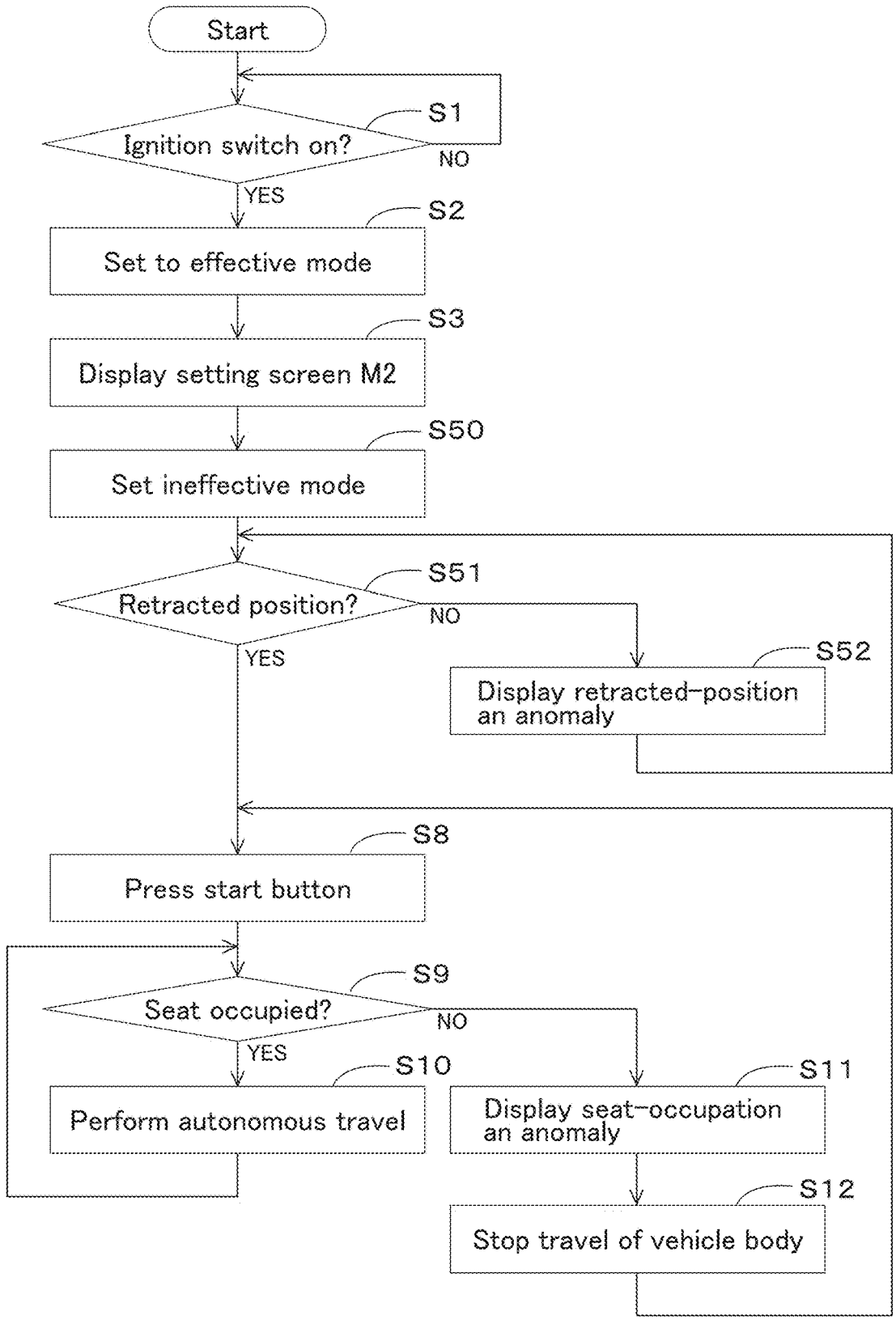
FIG. 19C illustrates an operation flow of autonomous travel according to the present preferred embodiment of the present invention different from those of FIGS. 19A and 19B.

FIG. 19C illustrates an operation flow of autonomous travel different from those of FIGS. 19A and 19B. Also in FIG. 19C, it is assumed that autonomous travel is not performed immediately after the ignition switch 42 is turned ON. FIG. 19C is an operation flow of autonomous travel in the ineffective mode.

As illustrated in FIG. 19C, the mode switch 40B determines whether or not the ignition switch 42 is ON (S1). For example, if the ignition switch 42 is ON (if the prime mover 4 is being driven or electric power is being supplied to electric components) (S1, Yes), the mode switch 40B sets to the effective mode (S2). When a predetermined operation is performed, the display 80 displays the setting screen M2 (S3).

On the setting screen M2, irrespective of the position of the obstacle detector 45 and the state of the operator's seat, it is possible to switch between the effective mode and the ineffective mode, that is, it is possible to accept the effective mode or the ineffective mode. If the ineffective mode is set on the setting screen M2 (S50), the autonomous travel controller 40A determines whether or not the obstacle detector 45 is in the retracted position (S51). If the obstacle detector 45 is not in the retracted position (551, No), the autonomous travel controller 40A outputs an anomaly (alarm) to the display 80, and the display 80 displays on the setting screen M2 or the like an anomaly (alarm) indicating that the obstacle detector 45 is not in the retracted position (S52). Descriptions of S8 to S12 in 19C, which are similar to those of FIGS. 19A and 19B, will be omitted.

In FIGS. 19A to 19C described above, when autonomous travel is being performed (during autonomous travel) in the ineffective mode, the autonomous travel controller 40A continues autonomous travel when in the retracted position, and, on the other hand, stops autonomous travel when changed from the retracted position to the detection position.

Hereafter, autonomous travel in the effective mode will be described. In FIGS. 19A to 19C described above, autonomous travel in the ineffective mode has been described. Autonomous travel in the effective mode is as follows.

When set in the effective mode, the autonomous travel controller 40A determines whether or not the obstacle detector 45 is in the detection position. The autonomous travel controller 40A starts autonomous travel if the obstacle detector 45 is in the detection position and starting of autonomous travel is acquired. In autonomous travel in the effective mode, the autonomous travel controller 40A may start autonomous travel if the following three conditions are satisfied: a condition that the obstacle detector 45 is in the detection position, a condition that starting of autonomous travel is acquired, and a condition that the operator's seat is occupied. When the effective mode is set before starting autonomous travel, if the obstacle detector 45 is in the retracted position, an anomaly (alarm) indicating that the obstacle detector 45 is in the retracted position may be displayed on the display 80.

The agricultural machine 1 includes the vehicle body 3, the obstacle detector 45 to detect obstacles, the autonomous travel controller 40A to perform autonomous travel of the vehicle body 3, the autonomous travel controller 40A being configured or programmed to, when performing the autonomous travel, stop the vehicle body 3 based on detection information about an obstacle detected by the obstacle detector 45, and the mode switch 40B to switch a mode during the autonomous travel in an agricultural field between an effective mode in which the stopping of the vehicle body 3 based on the detection information is allowed and an ineffective mode in which the stopping of the vehicle body 3 based on the detection information is not allowed. Thus, because the agricultural machine 1 includes the mode switch 40B, during autonomous travel in the agricultural field, when in the effective mode, it is possible to stop the vehicle body 3 based on the detection information detected by the obstacle detector 45. On the other hand, when in the ineffective mode, it is possible to perform autonomous travel without stopping the vehicle body 3, irrespective of the detection information of the obstacle detector 45. That is, on the assumption that autonomous travel is performed in the agricultural field, it is possible to stop detection of an obstacle to stop the vehicle body 3 or it is possible to refrain from stopping of the vehicle body 3 even if an obstacle is detected. In other words, whether or not to stop autonomous travel can be changed in accordance with the circumstances.

The agricultural machine 1 includes the support 50 to which the obstacle detector 45 is attached, the support 50 being capable of changing the position of the obstacle detector 45 to the detection position and to the retracted position, and the autonomous travel controller 40A is configured or programmed to be allowed to perform the autonomous travel when the autonomous travel controller 40A is in the ineffective mode and the obstacle detector 45 is in the retracted position. Thus, when the obstacle detector 45 is in the retracted position where the obstacle detector 45 cannot physically detect an obstacle or the like, it is possible to perform autonomous travel irrespective of whether or not an obstacle is detected.

The agricultural machine 1 includes the seat-occupation detector 43 to detect whether or not the operator's seat 10 is occupied, and the autonomous travel controller 40A is configured or programmed to be allowed to start the autonomous travel when the seat-occupation detector 43 is detecting that the operator's seat 10 is occupied. Thus, during manned autonomous travel, on condition that the operator's seat 10 is occupied by an operator, it is possible to perform autonomous travel irrespective of whether or not an obstacle is detected.

The agricultural machine 1 include: the support 50 to which the obstacle detector 45 is attached, the support 50 being capable of changing the position of the obstacle detector 45 to the detection position and to the retracted position, and the switch restraint 40C to allow the mode switch 40B to switch from the effective mode to the ineffective mode when the obstacle detector 45 is in the retracted position, and not allow the mode switch 40B to switch from the effective mode to the ineffective mode when the obstacle detector 45 is in the detection position. Thus, only when the obstacle detector 45 is in the retracted position and in a state in which the obstacle detector 45 cannot detect an obstacle (a state of not being in the detection position physically), it is possible to perform switching from the effective mode to the ineffective mode. That is, when an operator intentionally moves the obstacle detector 45 to the retracted position, it is possible to change the mode to the ineffective mode and thus to avoid a situation different from the operator's intention.

The agricultural machine 1 includes the seat-occupation detector 43 to detect whether the operator's seat is occupied, and the switch restraint 40D to allow the mode switch 40B to switch from the effective mode to the ineffective mode when the seat-occupation detector 43 is detecting that the operator's seat is occupied, and not allow the mode switch 40B to switch from the effective mode to the ineffective mode when the seat-occupation detector 43 detects that the operator's seat is not occupied. Thus, only when the operator's seat is occupied by an operator and manned autonomous travel is performed, it is possible to perform autonomous travel without stopping the vehicle body 3 irrespective of the detection information of the obstacle detector 45.

The agricultural machine 1 includes the seat-occupation detector 43 to detect whether the operator's seat is occupied, and the autonomous travel controller 40A is configured or programmed to, when performing the autonomous travel, continue performing the autonomous travel when the seat-occupation detector 43 is detecting that the operator's seat is occupied, and stop the autonomous travel when the seat-occupation detector 43 detects that the operator's seat is not occupied. Thus, during manned autonomous travel, it is possible to automatically stop autonomous travel when an operator leaves the operator's seat 10, and it is possible to increase the precision of manned autonomous travel.

The agricultural machine 1 includes the support 50 to which the obstacle detector 45 is attached, the support 50 being capable of changing the position of the obstacle detector 45 to the detection position and to the retracted position, and the autonomous travel controller 40A is configured or programmed to, when performing the autonomous travel and in the ineffective mode, continue performing the autonomous travel when the obstacle detector 45 is in the retracted position, and stop the autonomous travel when the position of the obstacle detector 45 changes from the retracted position to the detection position. Thus, during autonomous travel in the ineffective mode, if the position of the obstacle detector 45 changes from the retracted position to the detection position for any reason, it is possible to stop autonomous travel and to prevent the obstacle detector 45 from colliding with a structure (water supply/drainage equipment) in the agricultural field, crops, and the like in the autonomous travel in the ineffective mode.

The agricultural machine 1 includes the prime mover 4 and the ignition switch 42 operable to perform switching between ON and OFF of driving of the prime mover 4, and the mode switch 40B is configured or programmed to set the effective mode as a default according to switching of the ignition switch 42 from OFF to ON, and, when the ineffective mode is set, switch the ineffective mode to the effective mode according to switching of the ignition switch 42 from ON to OFF. Thus, for example, when the ignition switch 42 is switched from OFF to ON and the prime mover 4 is driven, or when the ignition switch 42 is switched from ON to OFF and driving of the prime mover 4 is stopped, it is possible to reliably start from the effective mode.

The agricultural machine 1 includes the display 80 to display whether the autonomous travel controller is in the effective mode or in the ineffective mode. Thus, it is possible to allow an operator to reliably grasp whether autonomous travel is performed in the effective mode or autonomous travel is performed in the ineffective mode.

The autonomous travel controller 40A is configured or programmed to stop the vehicle body 3 if the autonomous travel controller 40A, when in the effective mode, acquires detection of an obstacle by the obstacle detector 45 as the detection information. Thus, it is possible to reliably stop the vehicle body 3 when an obstacle is detected during autonomous travel in the effective mode.

The obstacle detector 45 is operable to, even when detecting an obstacle, not output detection of the obstacle to the autonomous travel controller 40A when in the ineffective mode. Thus, by not outputting detection of the obstacle to the autonomous travel controller 40A, it is possible to reliably prevent the autonomous travel controller 40A from stopping the vehicle body 3 due to detection of the obstacle.

In the ineffective mode, when autonomous travel is being performed, instead of not outputting detection of an obstacle (detection information) to the autonomous travel controller 40A even when detecting the obstacle, the obstacle detector 45 may output the detection information to the controller 40 other than the autonomous travel controller 40A to store the detection information in the controller 40. In such a case, while detection of an obstacle is not used to stop the vehicle body 3, it is possible to grasp what kind of an object is detected as the obstacle by analyzing the detection information. Moreover, it is possible to grasp the state of the agricultural field by associating the detection information with the position of the vehicle body (travel position).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:
a vehicle body;
an obstacle detector to detect obstacles, the obstacle detector, when detecting an obstacle, being configured to issue detection information about the detected obstacle;
an autonomous travel controller to perform autonomous travel of the vehicle body, the autonomous travel controller being configured or programmed to, when being in an effective mode and receiving the detection information from the obstacle detector while performing the autonomous travel, execute stopping travel of the vehicle body based on the detection information; and
a mode switch operable to switch the autonomous travel controller between the effective mode and an ineffective mode in which the autonomous travel controller when performing the autonomous travel does not execute the stopping travel of the vehicle body based on the detection information regardless of whether the autonomous travel controller receives the detection information from the obstacle detector; wherein
the stopping travel of the vehicle body based on the detection information is a series of processes which includes:
(a) determining, based on the detection information, whether or not the travel of the vehicle body is to be stopped; and
(b) actually stopping travel of the vehicle body upon determining that the travel of the vehicle body is to be stopped.

2. The agricultural machine according to claim 1, further comprising:
a support to which the obstacle detector is attached, the support being capable of changing a position of the obstacle detector to a detection position where the obstacle detector is able to detect obstacles and to a retracted position where the obstacle detector is unable to detect obstacles; wherein
the autonomous travel controller is configured or programmed to be allowed to perform the autonomous travel when the autonomous travel controller is in the ineffective mode and the obstacle detector is in the retracted position.

3. The agricultural machine according to claim 2, further comprising:
a seat-occupation detector to detect whether an operator's seat is occupied; wherein
the autonomous travel controller is configured or programmed to be allowed to perform the autonomous travel when the seat-occupation detector is detecting that the operator's seat is occupied.

4. The agricultural machine according to claim 1, further comprising:
a support to which the obstacle detector is attached, the support being capable of changing a position of the obstacle detector to a detection position where the obstacle detector is able to detect obstacles and to a retracted position where the obstacle detector is unable to detect obstacles; and a switch restraint configured to programmed to:
    allow the mode switch to switch from the effective mode to the ineffective mode when the obstacle detector is in the retracted position; and
    not allow the mode switch to switch from the effective mode to the ineffective mode when the obstacle detector is in the detection position.

5. The agricultural machine according to claim 1, further comprising:
    a seat-occupation detector to detect whether an operator's seat is occupied; and
    a switch restraint configured or programmed to:
        allow the mode switch to switch from the effective mode to the ineffective mode when the seat-occupation detector is detecting that the operator's seat is occupied; and
        not allow the mode switch to switch from the effective mode to the ineffective mode when the seat-occupation detector detects that the operator's seat is not occupied.

6. The agricultural machine according to claim 1, further comprising:
    a seat-occupation detector to detect whether an operator's seat is occupied; wherein
    the autonomous travel controller, when performing the autonomous travel, is configured or programmed to:
    continue performing the autonomous travel when the seat-occupation detector is detecting that the operator's seat is occupied; and
    stop the autonomous travel when the seat-occupation detector detects that the operator's seat is not occupied.

7. The agricultural machine according to claim 1, further comprising:
    a support to which the obstacle detector is attached, the support being capable of changing a position of the obstacle detector to a detection position where the obstacle detector is able to detect obstacles and to a retracted position where the obstacle detector is unable to detect obstacles; wherein
    the autonomous travel controller, when being in the ineffective mode and performing the autonomous travel, is configured or programmed to:
    continue performing the autonomous travel when the obstacle detector is in the retracted position; and
    stop the autonomous travel when the position of the obstacle detector moves from the retracted position to the detection position.

8. The agricultural machine according to claim 1, further comprising:
    a prime mover; and
    an ignition switch operable to perform switching between ON and OFF of driving of the prime mover; wherein
    the mode switch is operable to:
        set the effective mode as a default according to switching of the ignition switch from OFF to ON; and
        when the ineffective mode is set, switch the ineffective mode to the effective mode according to switching of the ignition switch from ON to OFF.

9. The agricultural machine according to claim 1, further comprising a display to display whether the autonomous travel controller is in the effective mode or in the ineffective mode.

10. The agricultural machine according to claim 1, wherein the autonomous travel controller is configured or programmed to stop the vehicle body if the autonomous travel controller, when in the effective mode, acquires detection of an obstacle by the obstacle detector as the detection information.

11. The agricultural machine according to claim 1, wherein, the obstacle detector is operable to, even when detecting an obstacle, not output detection of the obstacle to the autonomous travel controller when in the ineffective mode.

12. The agricultural machine according to claim 1, wherein the obstacle detector is operable to:
    notify the autonomous travel controller when in the effective mode that an obstacle is detected during the autonomous travel; and
    not notify the autonomous travel controller when in the ineffective mode that an obstacle is detected.

13. The agricultural machine according to claim 1, further comprising:
    a support to which the obstacle detector is attached, the support being capable of changing a position of the obstacle detector to a detection position where the obstacle detector is able to detect obstacles and to a retracted position where the obstacle detector is unable to detect obstacles; wherein
    the autonomous travel controller is configured or programmed to:
    be allowed to start performing the autonomous travel when the autonomous travel controller is in the effective mode and the obstacle detector is in the detection position;
    stop or not be allowed to start performing the autonomous travel when the autonomous travel controller is in the effective mode and the obstacle detector is in the retracted position;
    stop or not be allowed to start performing the autonomous travel when the autonomous travel controller is in the ineffective mode and the obstacle detector is in the detection position; and
    be allowed to start performing the autonomous travel when the autonomous travel controller is in the ineffective mode and the obstacle detector is in the retracted position.

14. The agricultural machine according to claim 13, further comprising:
    a seat-occupation detector to detect whether an operator's seat is occupied; wherein
    the autonomous travel controller is configured or programmed to be allowed to perform the autonomous travel when the seat-occupation detector is detecting that the operator's seat is occupied.

15. The agricultural machine according to claim 13, further comprising a switch restraint configured or programmed to:
    allow the mode switch to switch from the effective mode to the ineffective mode when the obstacle detector is in the retracted position; and
    not allow the mode switch to switch from the effective mode to the ineffective mode when the obstacle detector is in the detection position.

* * * * *